(12) United States Patent
Katahata et al.

(10) Patent No.: US 7,720,274 B2
(45) Date of Patent: May 18, 2010

(54) BOARD INSPECTION APPARATUS AND METHOD AND APPARATUS FOR SETTING INSPECTION LOGIC THEREOF

(75) Inventors: Takatoshi Katahata, Soraku-gun (JP); Hirotaka Wada, Nara (JP); Toshihiro Moriya, Nara (JP); Atsushi Shimizu, Yokohama (JP); Akira Nakajima, Otsu (JP)

(73) Assignee: OMRON Corporation, Kyoto (JP)

( * ) Notice: Subject to any disclaimer, the term of this patent is extended or adjusted under 35 U.S.C. 154(b) by 1098 days.

(21) Appl. No.: 11/377,938

(22) Filed: Mar. 16, 2006

(65) Prior Publication Data

US 2006/0257015 A1 Nov. 16, 2006

(30) Foreign Application Priority Data

Mar. 17, 2005 (JP) ............................. 2005-077285
Feb. 21, 2006 (JP) ............................. 2006-044312

(51) Int. Cl.
*G06K 9/00* (2006.01)
(52) U.S. Cl. ..................................................... 382/145
(58) Field of Classification Search ................. None
See application file for complete search history.

(56) References Cited

U.S. PATENT DOCUMENTS 4,953,100 A * 8/1990 Yotsuya ....................... 382/147
6,023,663 A * 2/2000 Kim ............................. 702/81

FOREIGN PATENT DOCUMENTS

| EP | 1388738 A1 | 2/2004 |
| JP | 2-78937 | 3/1990 |
| JP | 5-35850 | 2/1993 |
| JP | 9-145633 | 6/1997 |

OTHER PUBLICATIONS

European Search Report dated Jul. 11, 2007 issued in European Application No. 06111295.9-2218, 11 pages.

Jong-Seok Park; Julius T. Tou: "A Solder Joint Inspection System for Automated Printed Circuitboard Manufacturing" dated May 18, 1990, pp. 1290-1295, Proceedings IEEE International Conference on Robotics, XP002439950, 6 pages.

Takashi Anezaki: "Factory Worker-Oriented Programless Visual Inspection System" dated Oct. 11, 2000, IEEE International Conference on Systems, Man and Cybernetics, pp. 1175-1180, XP-002439951, 6 pages.

(Continued)

*Primary Examiner*—Samir A. Ahmed
*Assistant Examiner*—Fred Hu
(74) *Attorney, Agent, or Firm*—Osha • Liang LLP

(57) ABSTRACT

In generating inspection logic of a new component, the image of a new component is obtained, the trend data for selected characteristics of the focused region of the new component is computed; a previously inspected component having characteristics similar to that of the new component is selected by comparing the trend data of the new component with trend data of the previously inspected component, the image of the selected (previously inspected) component is read from the storage device, and inspection logic for the new component is generated using the images of the new component and images of the previously inspected component as teaching data.

14 Claims, 19 Drawing Sheets

OTHER PUBLICATIONS

Patent Abstracts of Japan; Publication No. 02-078937; Date of publication: Mar. 19, 1990 (2 pages).
Patent Abstracts of Japan; Publication No. 05-035850; Date of Publication: Feb. 12, 1993 (27 pages).
Patent Abstracts of Japan; Publication No. 09-145633; Date of publication: Jun. 6, 1997 (34 pages).
Machine Translation (full tex) of previously cited Japanese prior art publication No. JP02-078937 (41 pages—drawings 21 pages).

* cited by examiner

FIG. 5
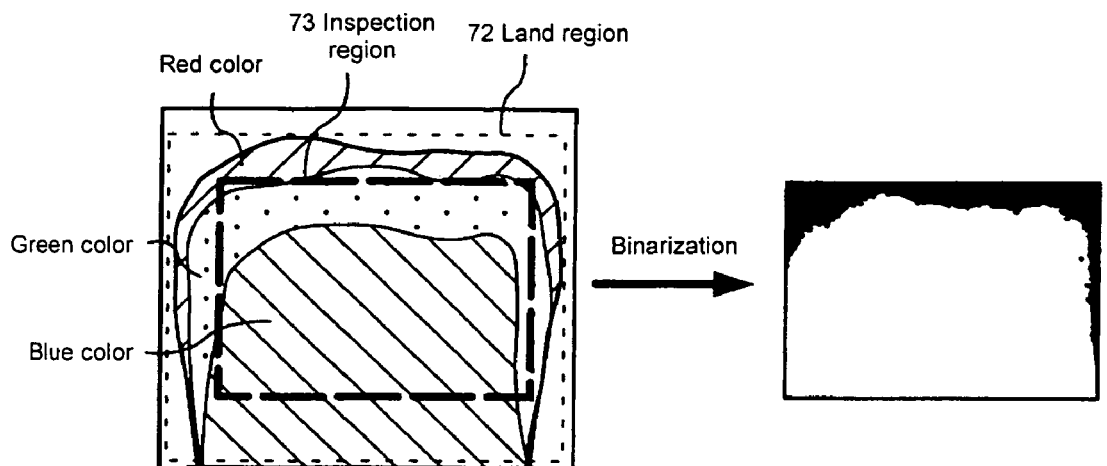
Acceptable image
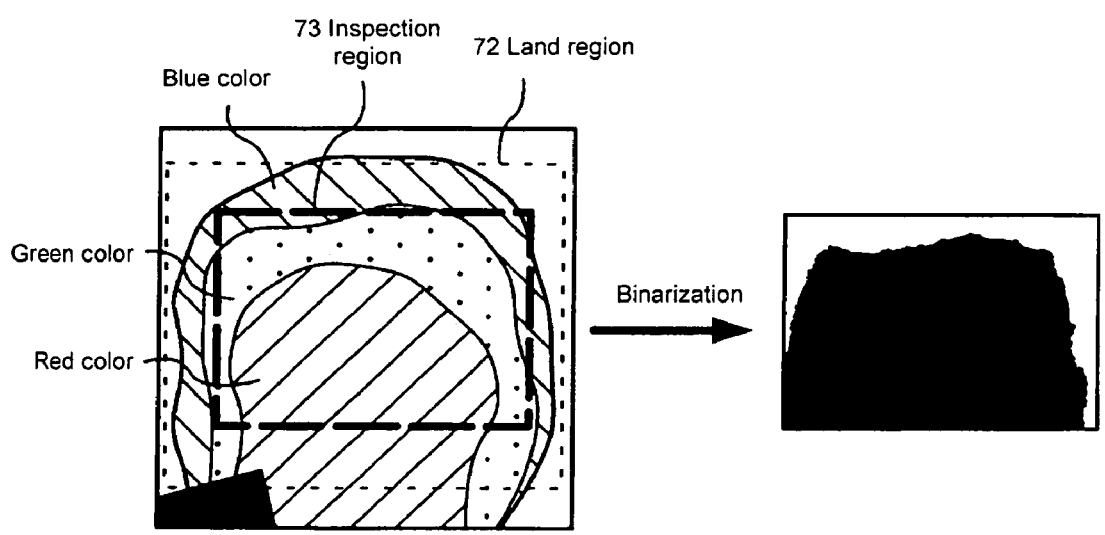
Defective image

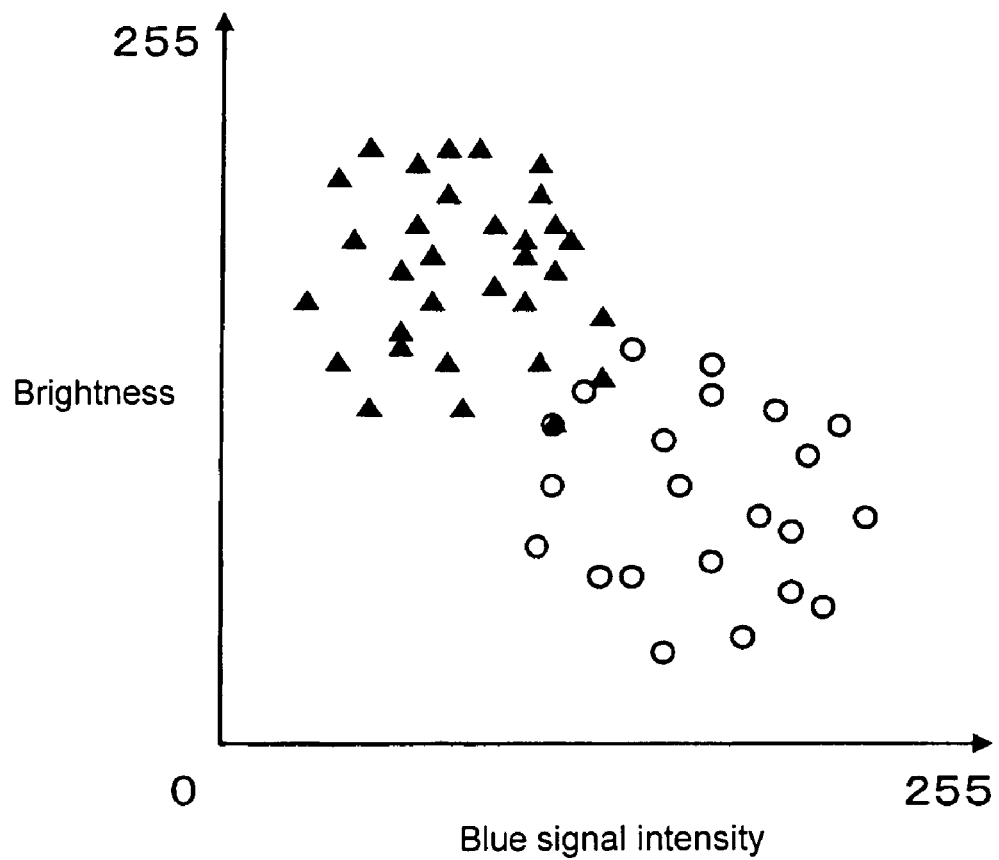
FIG. 9A  Two-dimensional color histogram
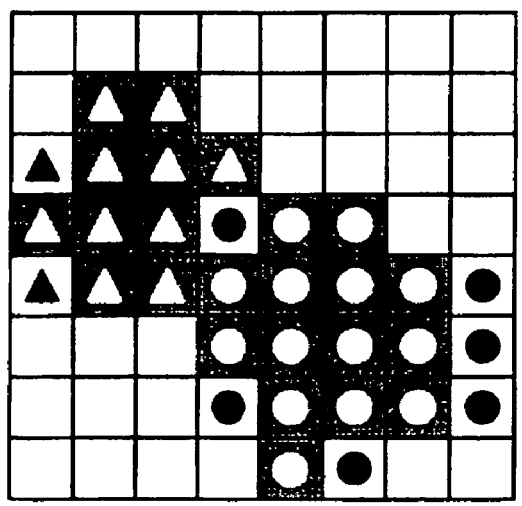
FIG. 9B  Color distribution trend data Hit-check determination block Mask block Hit-check determination block Mask block

BOARD INSPECTION APPARATUS AND METHOD AND APPARATUS FOR SETTING INSPECTION LOGIC THEREOF

BACKGROUND OF THE RELATED ART

1. Field of the Invention

The present invention relates to a technology for generating inspection logic used in a board inspection apparatus, particularly to the technology in which the inspection logic can be generated from a small amount of teaching data.

2. Description of the Related Art

Conventionally, there has been proposed a board inspection apparatus for inspecting surface-mounted quality of a printed board on which many electronic components are mounted, particularly the board inspection apparatus for performing the inspection by using an image in which the board or a part of the printed board is taken. In such pieces of inspection apparatus, it is necessary that inspection logic be previously established to determine whether the surface-mounted quality of the components is acceptable or defective.

Sometimes the following technique is adopted in the inspection apparatus in which the image is utilized. That is, an image in which an acceptable sample is taken and an image in which a defective sample is taken (teaching data) are analyzed to determine a difference between the acceptable image and the defective image, and the resulting inspection logic is used when analyzing an image to determine whether the surface-mounted quality of the corresponding component is acceptable or defective.

In this case, in order to generate the high-reliability inspection logic, it is desirable to previously prepare a sufficient amount of teaching data. However, at the actual production site, it is difficult to prepare a sufficient amount of teaching data before a new component is brought for inspection. Particularly, for a defective product, it is difficult to predict which kind of defect is generated during production, and there are innumerable variations in defects. Therefore, it is very difficult to prepare the sufficient number of samples that cover all the defects.

Accordingly, a sufficient amount of teaching data cannot be prepared for a certain time after the new component is brought for inspection, which results in a problem that inspection logic reliability cannot be improved.

Thus, there remains a need for a method for generating highly reliable inspection logic for a new component, which allows automation of teaching while requiring a reduced amount of teaching even in cases where there is a small number of samples.

SUMMARY

According to an embodiment of the invention, a method of setting inspection logic, relating to a previously processed component, includes a step of storing the image of the previously processed component; a step of computing, for instance, color distribution trend data which indicates a color distribution trend of the focused region in the image of the previously processed component; a step of obtaining the image of the new component; a step of computing color distribution trend data which indicates the color distribution trend of the focused region in the image of the new component; a step of selecting the previously processed component having the color distribution trend similar to that of the new component by comparing the color distribution trend data concerning the new component and the color distribution trend data concerning the previously processed component; a step of reading the image of the selected previously processed component from the storage device; and a step of generating the inspection logic of the new component using the image of the new component and the image of the read previously processed component as teaching data.

An apparatus according to an embodiment of the invention for setting inspection logic includes a storage device in which the image of the previously processed component is stored; an image obtaining device which obtains the image of the new component; a color distribution trend computing device which computes both color distribution trend data for indicating a color distribution trend of the focused region in the image of the new component and color distribution trend data for indicating the color distribution trend of the focused region in the image of the previously inspected component; a similarity component selecting device which selects the previously inspected component having the color distribution trend similar to that of the new component by comparing the color distribution trend data concerning the new component and the color distribution trend data concerning the previously inspected component; a teaching data generating device which reads the image of the selected previously inspected component from the storage device to generate teaching data from the image of the new component and the image of the previously inspected component; and an inspection logic generating device which generates the inspection logic from the teaching data.

A generating program according to an embodiment of the invention for inspection logic includes a process of computing color distribution trend data which indicates a color distribution trend of the focused region in the image of the previously inspected component stored in a storage device; a process of obtaining the image of the new component; a process of computing color distribution trend data which indicates the color distribution trend of the focused region in the image of the new component; a process of selecting the previously inspected component having the color distribution trend similar to that of the new component by comparing the color distribution trend data concerning the new component and the color distribution trend data concerning the previously inspected component; a process of reading the image of the selected previously inspected component from the storage device; and a process of generating the inspection logic of the new component using the image of the new component and the image of the read previously inspected component as teaching data. The program causes an information processing apparatus to execute the processes.

BRIEF DESCRIPTION OF THE DRAWINGS

FIG. 5 shows examples of binarization results of inspection areas in an acceptable image and a defective image;

FIG. 9A shows an example of a two-dimensional color histogram, and FIG. 9B shows an example of color distribution trend data;

DETAILED DESCRIPTION OF THE PREFERRED EMBODIMENTS

Preferred embodiments of the invention will be described below with reference to the accompanying drawings.

(Configuration of Board Inspection System)

Figure 1:
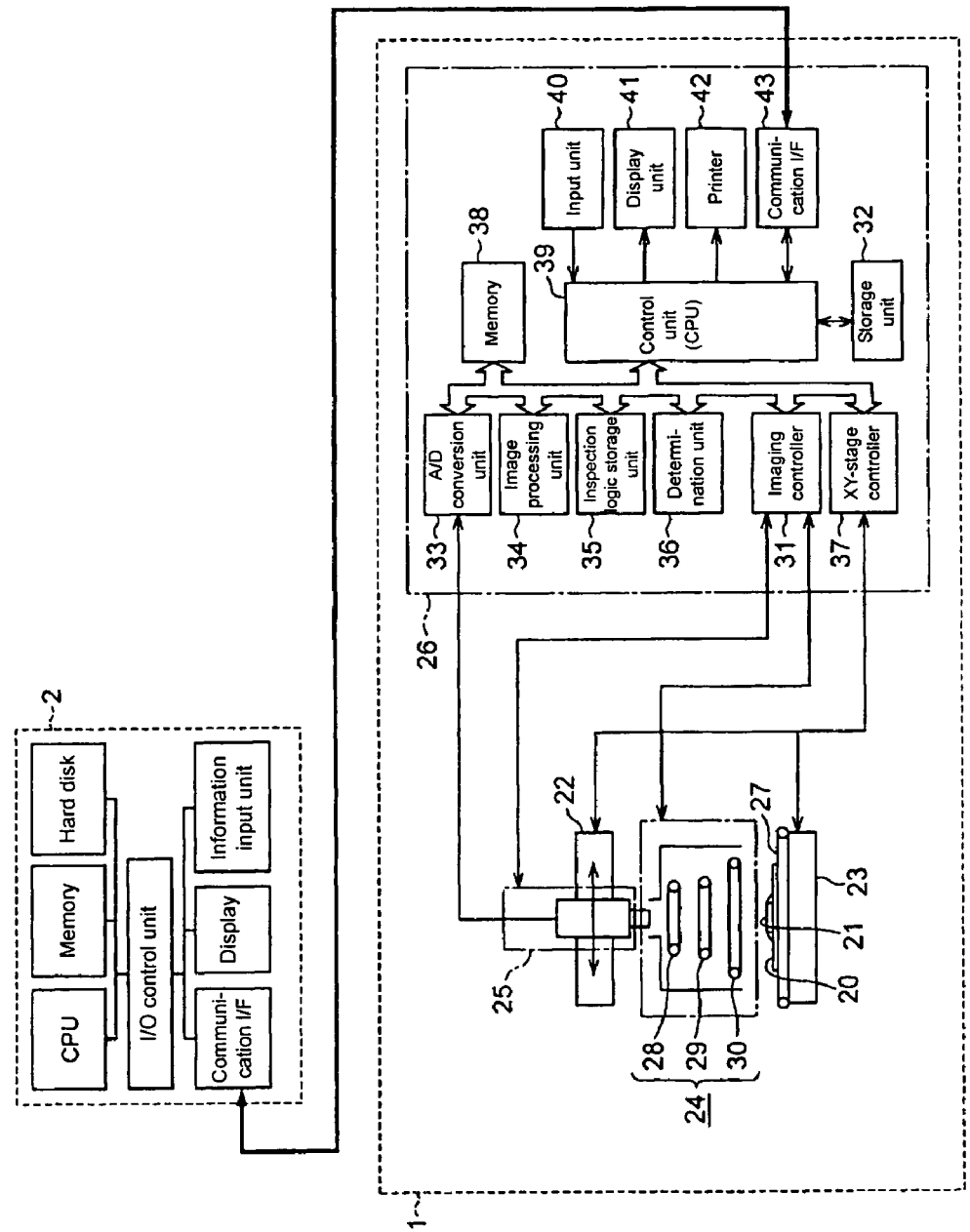
FIG. 1 shows a hardware configuration of a board inspection system according to an embodiment of the invention.

FIG. 1 shows a hardware configuration of a board inspection system according to an embodiment of the invention.

The board inspection system includes a board inspection apparatus 1 and an inspection logic setting apparatus 2. The board inspection apparatus 1 perform a board inspection process. The inspection logic setting apparatus 2 automatically generates inspection logic used in the board inspection process of the board inspection apparatus 1. Electronic data such as the image and a parameter can be transferred between the board inspection apparatus 1 and the inspection logic setting apparatus 2 through a wired or wireless network or a storage medium such as MO and DVD. In the embodiment, the board inspection apparatus 1 and the inspection logic setting apparatus 2 are individually formed. However, the board inspection apparatus and the inspection logic setting apparatus may be integrally formed by incorporating the function of the inspection logic setting apparatus into the board inspection apparatus main body.

(Configuration of Board Inspection Apparatus)

In the board inspection apparatus 1, a board 20 is illuminated with color light to take the image thereof, and the surface-mounted quality (such as soldering state) of a surface-mounted component 21 on the board 20 is automatically inspected with the image. The board inspection apparatus 1 substantially includes an X-stage 22, a Y-stage 23, a floodlighting unit 24, an imaging unit 25, and a control processing unit 26.

The X-stage 22 and the Y-stage 23 respectively include motors (not shown) driven based on a control signal from the control processing unit 26. The X-stage 22 moves the floodlighting unit 24 and the imaging unit 25 in an X-axis direction by the drive of the motor, and the Y-stage 23 moves a conveyer 27 in a Y-axis direction. The conveyer 27 supports the board 20.

The floodlighting unit 24 includes three annular light sources 28, 29, and 30. The light sources 28, 29, and 30 have the different diameters, and the light sources 28, 29, and 30 simultaneously emit red light, green light, and blue light based on the control signal from the control processing unit 26. Each center of the light sources 28, 29, and 30 is located immediately above an observation position, and the light sources 28, 29, and 30 are arranged in a direction in which the light sources 28, 29, and 30 correspond to different elevation angles when viewed from the observation position. The arrangements of the light sources 28, 29, and 30 allow the floodlighting unit 24 to illuminate the surface-mounted component 21 on the board 20 with plural colors of light (three colors of R, G, and B in the embodiment) at different incident angles.

The imaging unit 25 is a color camera which is positioned immediately above the observation position while orientated downward. Therefore, the light reflected from the board surface is taken by the imaging unit 25, and the light is converted into three primary color signals R, G, and B and supplied to the control processing unit 26.

The control processing unit 26 includes an A/D conversion unit 33, an image processing unit 34, an inspection logic storage unit 35, a determination unit 36, an imaging controller 31, an XY-stage controller 37, a memory 38, a control unit (CPU) 39, a storage unit 32, an input unit 40, a display unit 41, a printer 42, and a communication I/F 43.

The A/D conversion unit 33 is a circuit in which the color signals R, G, and B are inputted from the imaging unit 25 and converted into digital signals. Grayscale image data having a digital amount in each hue is transferred to an image data storage area in the memory 38.

The imaging controller 31 is a circuit which includes the interface for establishing connection between the control unit 39 and the floodlighting unit 24 and imaging unit 25. The imaging controller 31 adjusts light quantities of the light sources 28, 29, and 30 of the floodlighting unit 24 based on output of the control unit 39, and the imaging controller 31 performs the control such that the hue outputs of the imaging unit 25 are balanced with one another.

The XY-stage controller 37 is a circuit which includes the interface for establishing the connection between the control unit 39 and the X-stage 22 and Y-stage 23. The XY-stage controller 37 controls the drive of the X-stage 22 and Y-stage 23 based on the output of the control unit 39.

The inspection logic storage unit 35 is one in which the inspection logic used in the board inspection process is stored. The board inspection apparatus 1 can perform plural kinds of the inspection processes such as fillet inspection for inspecting a solder shape and missing inspection for inspecting missing of the component. The inspection logic is prepared in each kind of the inspection, and the inspection logic is mainly formed by a region condition which regulates an inspection target region (inspection region) in the image, a color condition which extracts a predetermined color pattern (pixel region) from the image in the inspection region, and a determination condition which determines whether the color pattern is acceptable or defective. The region condition is a condition which regulates a position, a size, a range, etc. of the inspection region in the image, for example, such that "the range of ±10 pixels from a leading edge of a lead toward the direction orthogonal to the lead and 20 pixels in the direction along the lead." The color condition is a condition which regulates focused color characteristic amounts (in this example, brightness and blue signal intensity) and value ranges of the color characteristic amounts, for example, such that "the pixel brightness ranges from 150 to 250 and the blue signal intensity ranges from 150 to 180." The determination condition is a condition which regulates a focused characteristic amount (in this example, area) and the value range of the characteristic amount (in this example, threshold), for example, such that "the area is not lower than 60% of the inspection region."

The image processing unit 34 is a circuit which performs a process of extracting the inspection region determined by the region condition from the image obtained by taking the component 21 on the board 20, a process of extracting the region satisfying the color condition from the image (inspection image) of the inspection region, and a process of computing the characteristic amount value used in the determination condition from the extracted region. The determination unit 36 is a circuit in which the characteristic amount value computed by the image processing unit 34 is received to perform the surface-mounted state determination process in which the surface-mounted state is determined based on whether the characteristic amount value satisfies the determination condition.

The input unit 40 includes a keyboard and a mouse, which input operation information and data concerning the board 20. The inputted data is supplied to the control unit 39. The communication I/F 43 transmits the data to and receives the data from the inspection logic setting apparatus 2 or other external devices.

The control unit (CPU) 39 is a circuit which performs various computation processes and control processes. The storage unit 32 is one which includes a hard disk and a memory. The program executed in the control unit 39, the CAD information on the board, the determination result of the board inspection process, etc. are stored in the storage unit 32.

Figure 2:
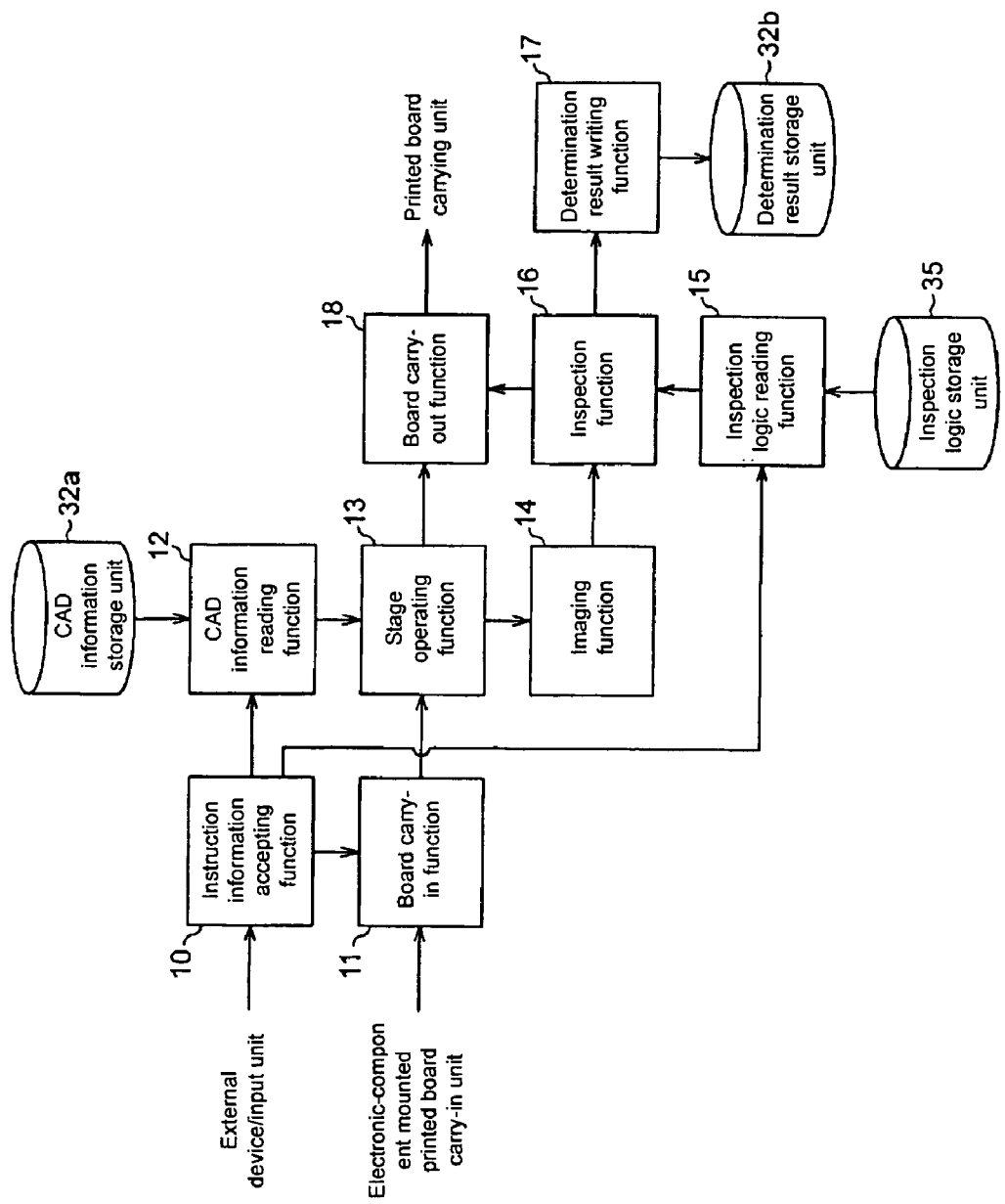
FIG. 2 shows a functional configuration example of a board inspection apparatus.

FIG. 2 shows a functional configuration of the board inspection apparatus 1. The board inspection apparatus 1 includes an instruction information accepting function 10, a board carry-in function 11, a CAD information reading function 12, a stage operating function 13, an imaging function 14, an inspection logic reading function 15, an inspection function 16, a determination result writing function 17, and a board carry-out function 18. The control unit 39 controls the above-described pieces of hardware to realize these functions according to a program stored in the storage unit 32. A CAD information storage unit 32a and a determination result storage unit 32b are provided in the storage unit 32.

(Board Inspection Process)

Then, the board inspection process in the board inspection apparatus 1 will be described. Fillet inspection will be described here as an example of the board inspection process. The fillet inspection is a process of determining whether the shape of a solder fillet is acceptable or defective.

Figure 3:
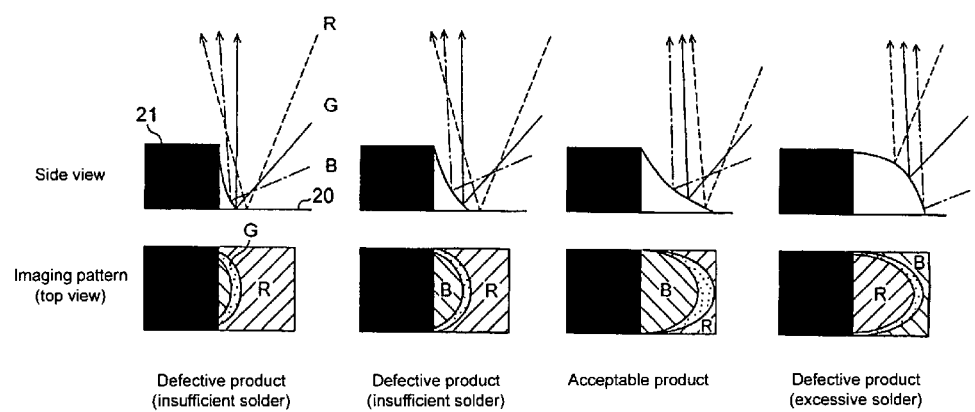
FIG. 3 shows a relationship between a shape and an imaging pattern of a solder fillet.

As shown in an upper portion of FIG. 3, in the acceptable solder fillet, a broad inclined plane are formed from the component 21 to the land on board 20 like a plane at the foot of a mountain. On the contrary, the area of the inclined plane is decreased when insufficient solder is generated, and the solder fillet swells on the land when excessive solder is generated.

Figure 19:
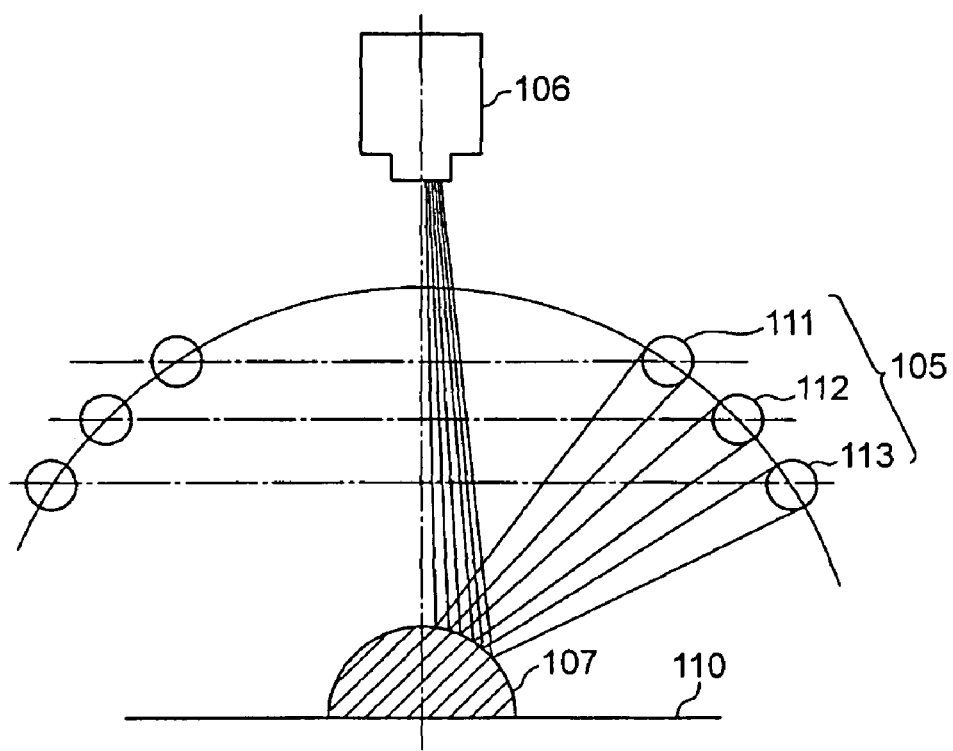
FIG. 19 shows a configuration of a color highlight-method board inspection apparatus.

FIG. 19 shows a state in which the solder fillet is illuminated from the floodlighting unit 24. At this point, because the red, green, and blue illumination light beams are incident to the solder fillet at different incident angles, the hue of the reflected light incident to the imaging unit 25 is changed according to the inclination of the solder fillet. The images shown in a lower portion of FIG. 3 are obtained when the reflected light is taken by the board inspection apparatus 1. That is, the reflected light of the blue light whose incident angle is the smallest is dominant in a portion where the inclination is steep, while the reflected light of the red light is dominant in a portion where the inclination is little. Accordingly, the blue hue region is increased in the acceptable solder fillet, and the hue regions except for blue hue region are increased in the defective solder fillet.

Figure 4:
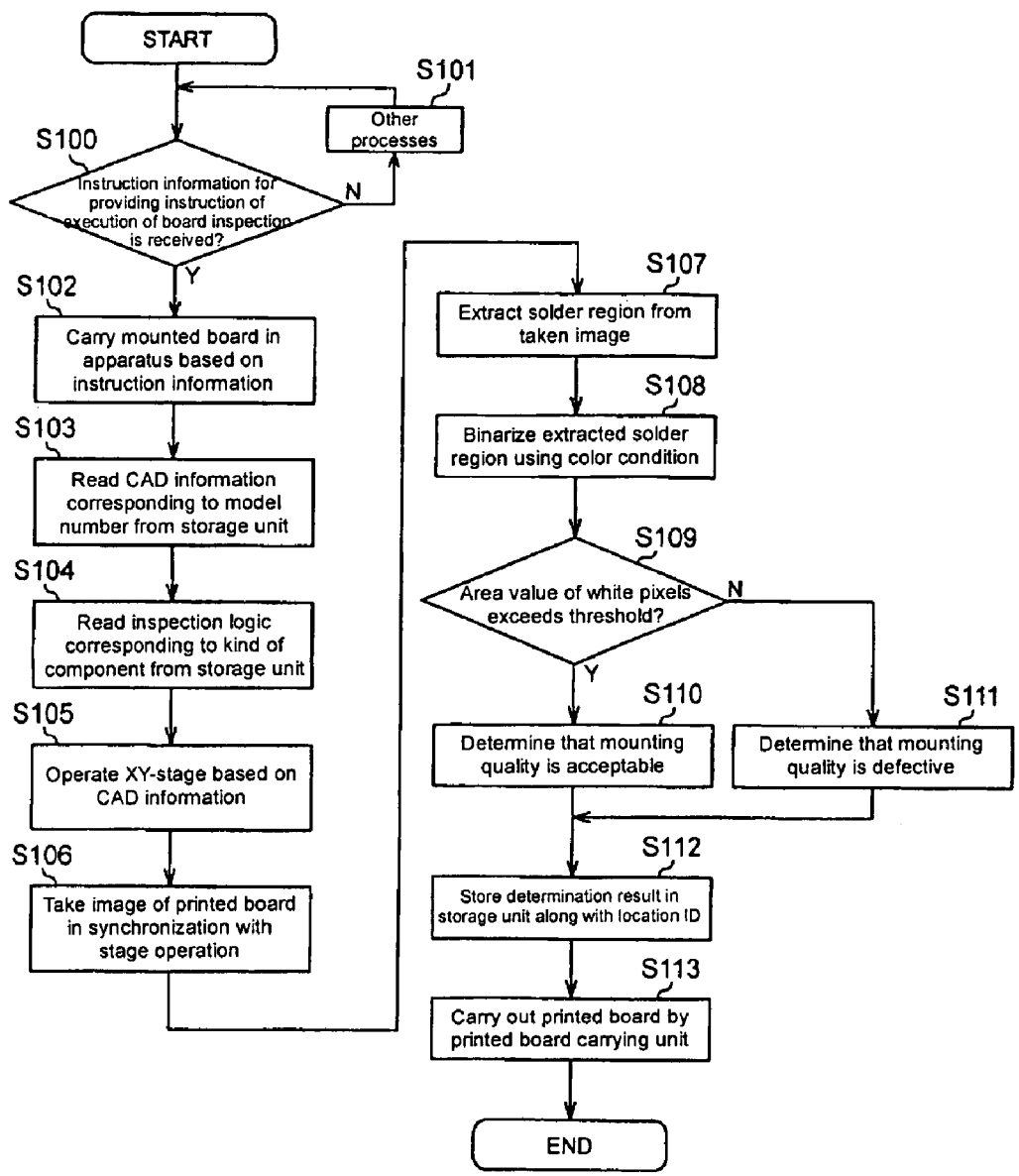
FIG. 4 shows a flowchart of a board inspection process.

In the fillet inspection of the embodiment, the determination whether the solder fillet is acceptable or defective is made based on a size (area) of the blue region by utilizing a color pattern trend. Then, a flow of the fillet inspection process will specifically be described with reference to a flowchart of FIG. 4.

The instruction information accepting function 10 is in a waiting state until instruction information for providing an instruction of execution of the board inspection is inputted (NO in Step S100 and Step 101). When the instruction information is inputted by operating the input unit 40 or from the external device through the communication I/F 43, the instruction information accepting function 10 transmits the instruction information to the board carry-in function 11, the CAD information reading function 12, and the inspection logic reading function 15 (YES in Step S100). The instruction information includes information (such as a model number) on the board which is of the inspection target.

The board carry-in function 11 carries the board 20 which is of the inspection target onto the conveyer 27 from the printed board carry-in unit based on the instruction information (Step S102), and the CAD information reading function 12 reads the CAD information corresponding to the board model number from the CAD information storage unit 32a (Step 103). The CAD information includes the size and shape of the board 20, the number of components, and the kinds and surface-mounted positions of the components mounted on the board 20. The inspection logic reading function 15 reads the inspection logic for fillet inspection from the inspection logic storage unit 35 according to the kind of the component obtained from the CAD information (Step S104). The inspection logic includes the region condition, the color condition, and the determination condition.

The stage operating function 13 obtains the pieces of information such as the size and shape of the board 20 and the component arrangement from the read CAD information, and the stage operating function 13 operates the X-stage 22 and Y-stage 23 through the XY-stage controller 37 such that the plural components mounted on the board 20 are sequentially aligned with the observation position (imaging position) (Step S105).

On the other hand, the imaging function 14 causes the three light sources 28, 29, and 30 of the floodlighting unit 24 to emit the light through the imaging controller 31 to simultaneously illuminate the board 20 with the red, green, and blue light beams. The imaging function 14 controls the imaging unit 25 through the imaging controller 31 to take the image of the component 21 on the board 20 in synchronization with the operations of the stages 22 and 23 (Step 106). The image is captured in the memory 38.

The inspection function 16 extracts the solder region from the image by the image processing unit 34 (Step 107). The solder region extracted in Step S107 is the region regulated by the region condition of the inspection logic (also referred to as focused region). For example, the region condition is regulated by a coordinate relative to the image or a coordinate relative to the land region or component region in taking the image. As shown in FIG. 5, a rectangular region condition regulated by upper, lower, right, and left coordinates (designated by the number of pixels or a ratio) relative to a land region 72 is used in the embodiment. The shape of an inspection region 73 regulated by the region condition is not limited to the rectangular shape, but various shapes such as a circle, an oval, a polygonal shape, and free shape may be used as the shape of the inspection region 73. The land region or the component region can automatically be specified in taking the image by, for example, template matching.

The inspection function 16 binarizes the extracted solder region (inspection region) using the color condition (Step S108). At this point, it is assumed that both the blue signal intensity and the brightness take the 256 levels ranging from 0 to 255. The color condition used in this case is formed by four values of an upper limit and a lower limit of the blue signal intensity and upper limit and a lower limit of the brightness. In the binarizing process, the pixel included in the color range defined by the color condition is converted into a white pixel, and other pixels are converted into black pixels.

The post-binarization solder region is shown on the right side of FIG. 5. As can be seen from FIG. 5, the blue regions in the solder region are extracted as the white pixel to clarify a difference (characteristic) between the acceptable image and the defective image by the binarization on the color condition.

Then, the inspection function 16 extracts the characteristic amount of the white pixel region by the image processing unit 34. In this case, the area (the number of pixels) of the white pixel regions is computed as the characteristic amount. The inspection function 16 transfers the area value of the white pixel regions to the determination unit 36. The determination unit 36 compares the area value of the white pixel regions to a threshold (Step S109). When the area value exceeds the threshold (YES in Step S109), it is determined that the solder mounting quality of the component 21 is acceptable (Step S110). When the area value is not more than the threshold (NO in Step S109), it is determined that the solder mounting quality of the component 21 is defective (Step S111).

The determination result writing function 17 with the determination result in the determination result storage unit 32$b$ along with a location ID (information for specifying the component) (Step S112).

When the inspection is performed to all the components on the board 20, the board carry-out function 18 carries out the board 20 by the printed board carrying unit, and the board inspection process is ended (Step S113).

According to the above-described board inspection process, the three-dimensional shape can accurately be comprehended by the color pattern emerging in the two-dimensional image, so that it can correctly be determined whether the solder mounting quality (mounted state) is acceptable or defective. The position where the difference between the acceptable product and the defective product emerges clearly is extracted from the image, and the inspection is performed using the inspection region, so that the good determination accuracy can be obtained.

In order to realize the high determination accuracy such that the defective product is not overlooked while over-detection is not more than a permissible value, it is necessary that the color condition and the determination condition be set at optimum values by adapting the color condition and the determination condition to the inspection target. In the embodiment, the generation (teaching) of the inspection logic is automatically performed by the inspection logic setting apparatus 2. The generation of the inspection logic will be described in detail below.

(Configuration of Inspection Logic Setting Apparatus)

As shown in FIG. 1, the inspection logic setting apparatus 2 is formed by a general-purpose computer (information processing apparatus) in which CPU, a memory, a storage device such as the hard disk, an I/O control unit, a communication I/F, a display unit, and an information input unit (keyboard or mouse) are included as basic hardware.

The function of the inspection logic setting apparatus 2 mainly includes a teaching data generating unit and an inspection logic generating unit. The teaching data generating unit generates teacher image information (teaching data) used in teaching, and the inspection logic generating unit generates the inspection logic from the teacher image information.

(Teaching data Generating Process)

Figure 6:
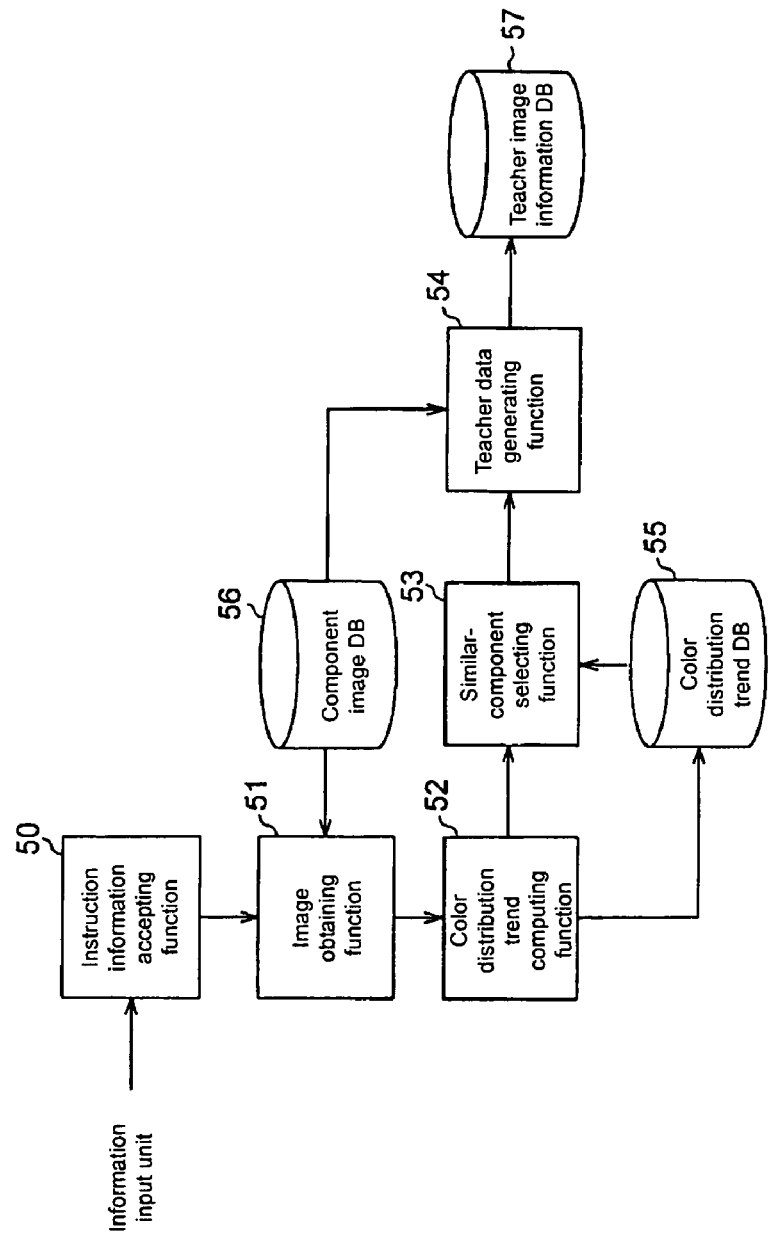
FIG. 6 shows a functional configuration example of a teaching data generating unit of an inspection logic setting apparatus.

FIG. 6 shows a block diagram of a functional configuration of the teaching data generating unit. The teaching data generating unit includes an instruction information accepting function 50, an image obtaining function 51, a color distribution trend computing function 52, a similar-component selecting function 53, and a teaching data generating function 54. A program stored in the memory or storage device is read and executed by CPU to realize these functions.

A color distribution trend DB 55, a component image DB 56, and a teacher image information DB 57 are provided in the storage device of the inspection logic setting apparatus 2. Color distribution trend data of the component processed in times past is stored in the color distribution trend DB 55, the component image taken by the board inspection apparatus 1 is stored in the component image DB 56, and the teacher image information is stored in the teacher image information DB 57. The image of the component (new component), which is of the target of the teaching data generating process and inspection logic generating process, and the image of the component processed in times past (previously inspected component) are stored in the component image DB 56.

Figure 7:
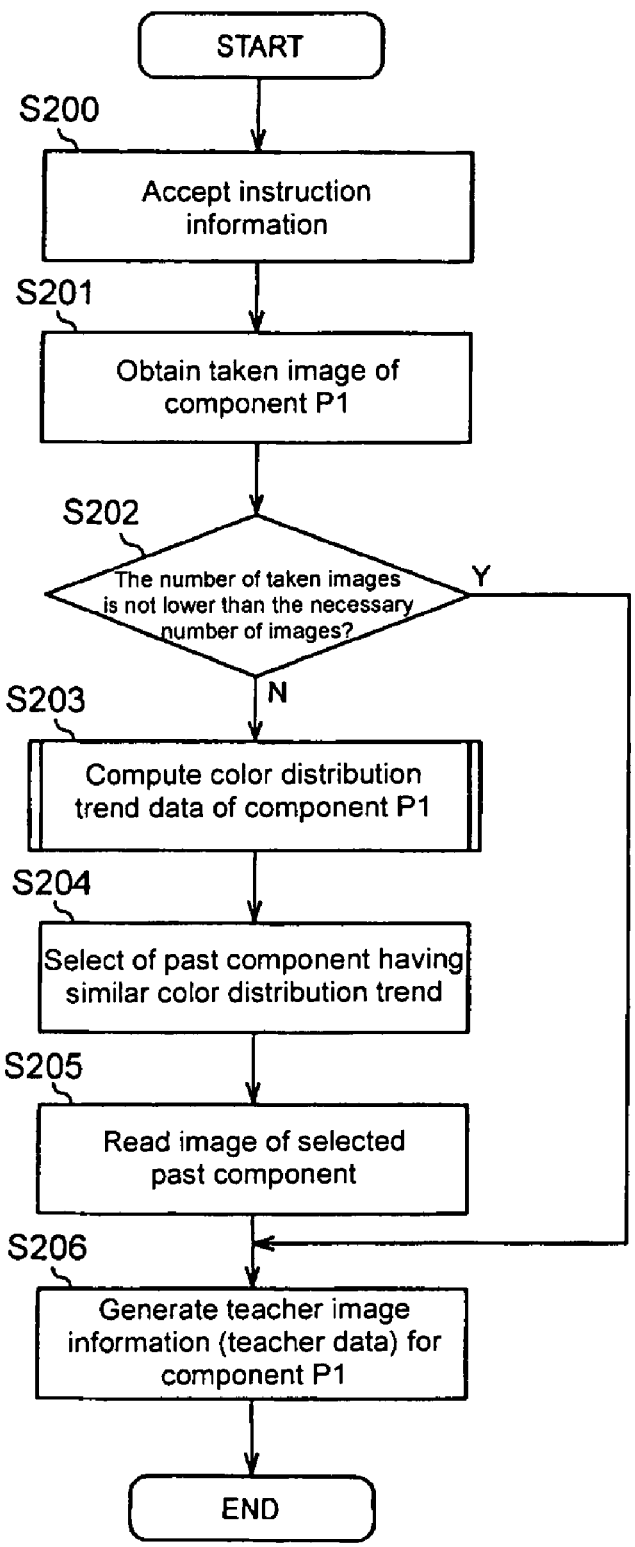
FIG. 7 shows a flowchart of a teaching data generating process.

A flow of a teaching data generating process will be described with reference to a flowchart of FIG. 7.

The instruction information accepting function 50 accepts instruction information for generating the teaching data from a user (Step S200). The instruction information includes information (such as the kind of the component) on the new component (hereinafter referred to as "component P1") which is of the process target, information for specifying the image of the component P1 stored in the component image DB 56, information for specifying the inspection to be performed, etc.

The image obtaining function 51 obtains the image of the component P1 from the component image DB 56 (Step S201). The board inspection apparatus 1 takes the images of plural samples of the previously prepared component P1 to obtain the image.

The image obtaining function 51 determines whether the image obtained (namely, the sample of the component P1) satisfies the conditions required to generate the inspection logic for the current inspection (Step S202). Specifically, when the number of acceptable samples (the number of acceptable images) and the number of defective samples (the number of defective images) are not lower than the predetermined necessary number of images respectively, it is determined that the inspection logic can be generated. Although the necessary number of images is arbitrarily set by the user, generally hundreds to thousands samples are preferably required in order to generate the high-reliability inspection logic.

The case, in which both the number of acceptable samples and the number of defective samples do not reach the necessary number of images, is cited here as an example. That is, a procedure of generating the sufficient amount of teaching data from the few number of sample images will be described below.

When the number of images is lower than the necessary number of images (NO in Step S202), the color distribution trend computing function 52 computes the color distribution trend data from the image of the component P1 (Step S203). The color distribution trend data expresses a color distribution trend of the focused region in the image.

Figure 8:
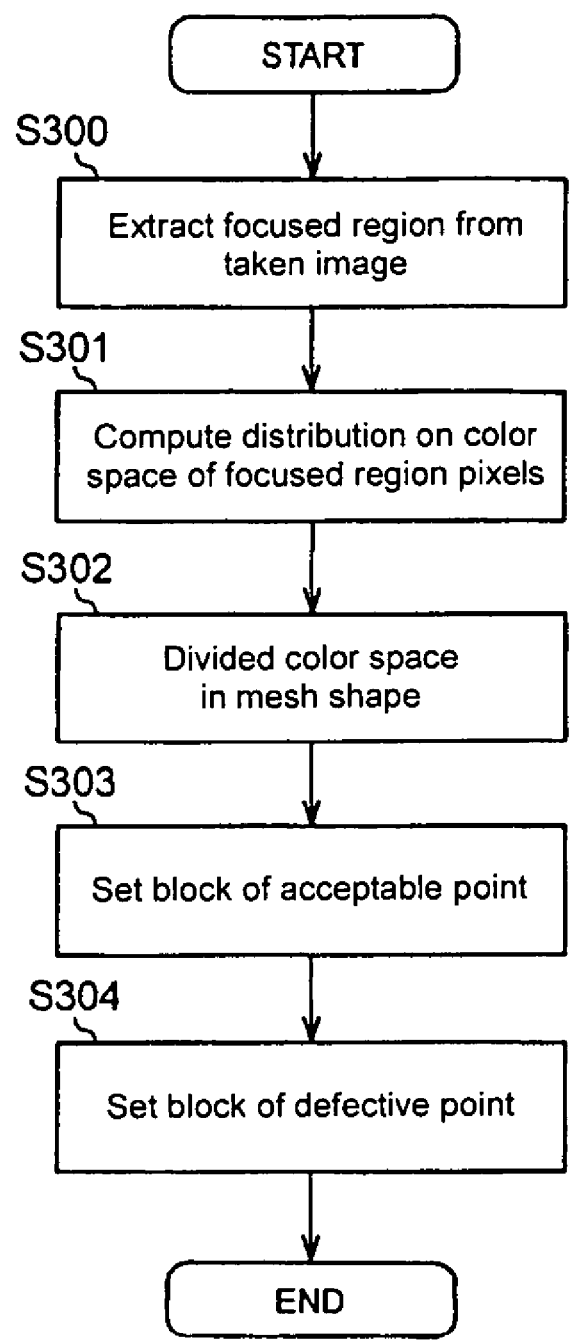
FIG. 8 shows a flowchart of a color distribution trend data generating process.

A flow of a color distribution trend data generating process will be described with reference to a flowchart of FIG. 8.

The focused region is extracted from each image (Step S300). The focused region is a portion (also referred to as inspection region) where the color is checked in the inspection. The focused region is previously set in each kind of the inspection. For example, the focused region is the solder portion or the land portion in the case of the fillet inspection, and the focused region is the component portion in the case of the component missing inspection. The focused region can automatically be extracted by the image recognition process such as the template matching.

Then, a distribution on a color space is determined for the color characteristic amount of all the pixels of the extracted focused region (Step S301). At this point, the distribution for the focused region pixels in the acceptable product (hereinafter referred to as "acceptable point") and the distribution for the focused region pixels in the defective product (hereinafter referred to as "defective point") are determined so as to be able to be distinguished from each other. A color histogram is used in the following description for the purpose of visual explanation of the color distribution. The color histogram is one in which a frequency of the pixel (the number of pixels) is recorded in each point within a multi-dimensional color space having the axis of the color characteristic amount. The color distribution of the focused region in the image can be comprehended by the color histogram.

Generally the color space is a multi-dimensional space formed by at least three kinds of the color characteristic amounts. Therefore, in order to correctly comprehend the color distribution of the pixel, it is preferable to consider at least two kinds of the color characteristic amounts. However, since the three color light sources of red, green, and blue are used in the method of the embodiment, frequently each color emerges characteristically in the image. Particularly, in the portion where the reflection close to mirror reflection is generated like the solder surface, the blue (in the acceptable case) or the red (in the defective case) tend to emerge strongly according to the inclination angle of the portion. Accordingly, in order to comprehend the difference between the acceptable color distribution and the defective color distribution, it is said that the hue can sufficiently be comprehended considering the one (for example, blue) or two (for example, blue and red) color characteristic amounts. It is necessary that the kind of the color characteristic amount be selected such that the clear difference is generated between the distribution of the color characteristic amount values obtained from the pixels of the focused region in the acceptable product and the distribution of the color characteristic amount values obtained from the pixels of the focused region in the defective product. This is because the difference in color distribution trend emerges clearly in each kind of the component. Therefore, in the embodiment, the blue is selected as the hue and the frequency is computed in each combination of the blue intensity and the brightness, because the blue is included in the focused region of the acceptable product while the blue is hardly included in the focused region of the defective product.

FIG. 9A shows an example of a two-dimensional color histogram. In FIG. 9A, a horizontal axis indicates the blue intensity, and a vertical axis indicates the brightness. Both the blue intensity and the brightness are expressed by the 256 levels ranging from 0 to 255. The blue signal intensity becomes weaker as the blue intensity is brought close to zero. That is, the blue component is not included in the pixel as the blue intensity is brought close to zero, and the blue signal intensity becomes stronger as the blue intensity is brought close to 255. The brightness is increased as the value of the brightness is increased. In FIG. 9A, a white circle (○) expresses the point at which the acceptable frequency is at least one, and a black triangle (▲) expresses the point at which the defective frequency is at least one. The white circle and the black triangle have the data of the frequency (the number of pixels having the color) in addition to (blue intensity, brightness). However, because the frequency information is not required for the below-mentioned computation of the color distribution trend data, the two-dimensional data of (blue intensity, brightness) may be used in the teaching data generating process.

The color histogram in itself shown in FIG. 9A may be dealt with as the color distribution trend data. However, as shown in FIG. 9B, the color distribution trend which is further simplified and formalized by processing (rounding) the color histogram is used as the color distribution trend data in the embodiment.

FIG. 10 shows a color distribution trend data generating process. The two-dimensional color space of the color histogram is divided in a mesh shape (Step S302). In the example shown in FIG. 10A, the color space is divided into 64 blocks of eight by eight. The partitions in the horizontal direction are expressed by A to H, the partitions in the vertical direction are expressed by 1 to 8, and the block where the partition A and the partition 1 intersect each other is expressed by block A1. The number of partitions is not limited to 8, but the color space may be divided into the arbitrary number of partitions. As shown in FIG. 10B, each block is further divided into nine sub-blocks of three by three in order to utilize the computation of a round-off error.

The color distribution trend computing function 52 checks which pixel point on the color histogram belongs to the block, and the color distribution trend computing function 52 also checks which pixel point belongs to the sub-block. The block to which the point belongs is set at hit-check determination block, and a mask block is set around the hit-check determination block based on the position of the sub-block to which the point belongs (namely, displacement amount of the acceptable point from the center of the block).

The hit-check determination block is a block which is utilized for both a hit mash and hit-check determination in the later-mentioned similarity determination process (identification process), and the mask block is a block which is utilized only for the hit mask in the similarity determination process. In this case, when the pixel point exists in the upper-left sub-block, the three blocks of the left, upper-left, and upper blocks of the block in which the pixel point exists are set at the mask block. Similarly, the three blocks of the upper-left, upper, and upper-right blocks are selected as the mask block, when the pixel point exists in the upper-center sub-block. The three blocks of the upper, upper-right, and right blocks are selected as the mask block, when the pixel point exists in the upper-right sub-block. The three blocks of the upper-left, left, and lower-left blocks are selected as the mask block, when the pixel point exists in the left-center sub-block. The three blocks of the upper-right, right, and lower-right blocks are selected as the mask block, when the pixel point exists in the right-center sub-block. The three blocks of the left, lower-left, and lower blocks are selected as the mask block, when the pixel point exists in the lower-left sub-block. The three blocks of the lower-left, lower, and lower-right blocks are selected as the mask block, when the pixel point exists in the lower-center sub-block. The three blocks of the lower, lower-right, and right blocks are selected as the mask block, when the pixel point exists in the lower-right sub-block. The mask block corresponds to the round-off error of the pixel position. The mask block is not set in the center sub-block of the block.

Figure 10A:
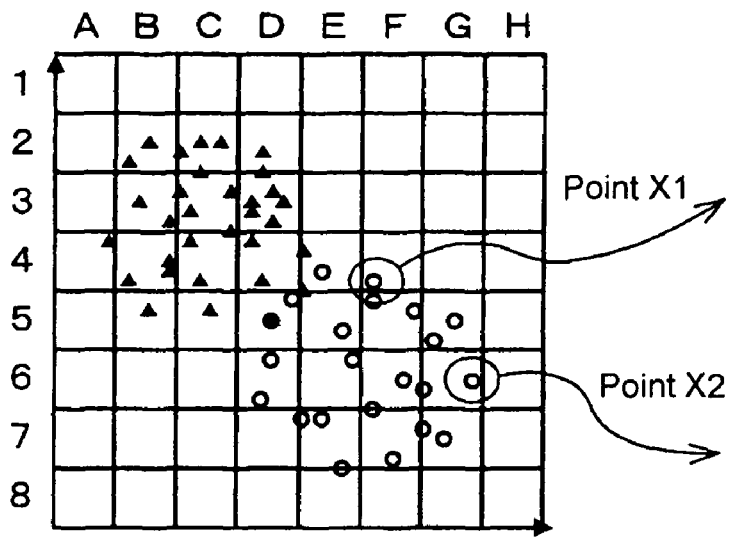
FIG. 10 shows a color distribution trend data generating process.
Figure 10B:
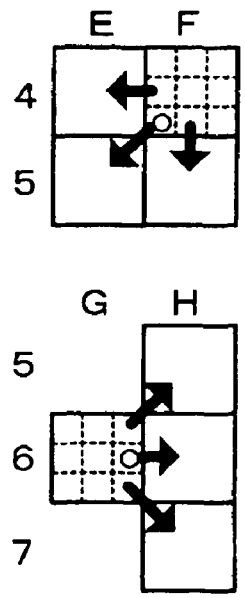
Figure 10C:
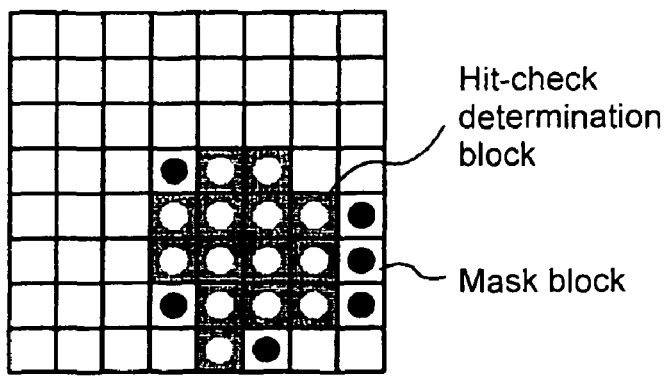

Given a specific example, in the case of a point X1 shown in FIG. 10B, a block F4 is set at the hit-check determination block and blocks E4, E5, and F5 are set at the mask block. In the case of a point X2, a block G6 is set at the hit-check determination block and blocks H5, H6, and H7 are set at the mask block. When the plural settings are performed to one block, the setting of the hit-check determination block has higher priority than that of the mask block.

Figure 10D:
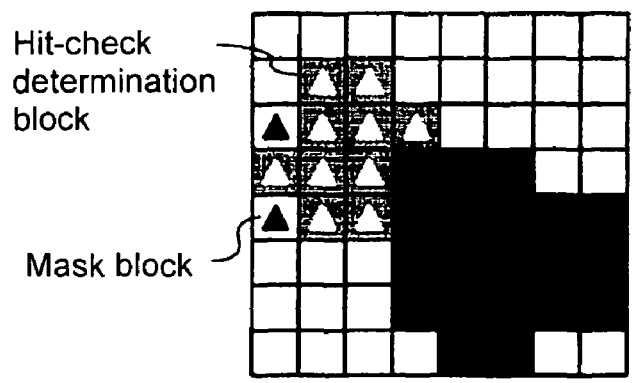

When the hit-check determination block and the mask block are set for all the acceptable points (Step S303, FIG. 10C), the hit-check determination block and the mask block are set for all the defective points (Step S304, FIG. 10D). However, the defective point is processed such that the block in which the setting is already performed in the acceptable point is avoided.

As shown in FIG. 9B, the rounding process is performed to both the acceptable point and the defective point to generate the color distribution trend data. The color distribution trend data corresponds to data in which the distribution (color distribution) on the color space of the color characteristic amount value obtained from the pixels of the focused region is expressed by the combination of the blocks. According to the expression form, because the pixel color distribution is simplified and formalized, the color distribution trend can easily be comprehended rather than the pixel distribution on the color histogram. Particularly, the pixel color distribution is the form to which a computer process is easily performed, so that the similarity determination process (identification process) of the color distribution trend is extremely facilitated. The data expressed by the combination of the blocks corresponds to one in which the pixel distribution on the two-dimensional color space is converted into the coarse data, and the conversion has a smoothing effect. Therefore, the error and variation included in the pixel distribution can be reduced, which generates an advantage that the reliability of the similarity determination process can be improved. The color distribution trend data also has the advantage that the data size is extremely small compared with the color histogram. For example, one block has five statues of the hit-check determination block (shown by white circle with hatching) of the acceptable point, the mask block (shown by black circle) of the acceptable point, the hit-check determination block (shown by white triangle with hatching) of the defective point, the mask block (shown by black triangle) of the defective point, and no setting. Therefore, when one bit is allocated to each status, one block can be expressed by five bits.

The color distribution trend data of the component P1 which is computed by the above process is stored in the color distribution trend DB 55. The pieces of color distribution trend data of the many components which has processed in times past are stored in the color distribution trend DB 55 along with the kind of the component and the type of inspection.

The similar-component selecting function 53 compares the color distribution trend data concerning the component P1 and the color distribution trend data concerning the previously inspected component registered in the color distribution trend DB 55, and the similar-component selecting function 53 selects the previously inspected component whose color distribution trend is similar to that of the component P1 (Step S204). The similar determination process (identification) for color distribution trend is as follows.

A set of hit-check determination blocks is expressed by HB, a set of hit-check determination blocks and mask blocks is expressed by MB, and the set of hit-check determination blocks and the set of the hit-check determination blocks are respectively expressed by HBX and MBX for a set of components PX. When both the following expressions are true, it is determined that the component P1 is similar to the previously inspected component P2.

$$(MB1 \cap MB2) \supseteq HB1$$

$$(MB1 \cap MB2) \supseteq HB2$$

When either of the above expressions is false, it is determined that the component P1 is not similar to the previously inspected component P2. Where the sign "$\cap$" indicates a product of two sets, and the sign "$\supseteq$" indicates that the right-side set is a subset of the left-side set.

That is, in the embodiment, a common distribution range (hit mask) of the components P1 and P2 is roughly narrowed by determining the product set (MB1$\cap$MB2) of the color distribution ranges (MB1 and MB2) including the round-off errors, and similarity/no similarity is determined based on whether the common distribution range includes the color distribution ranges (HB1, HB2) which do not include the round-off errors of components P1 and P2.

Figure 11:
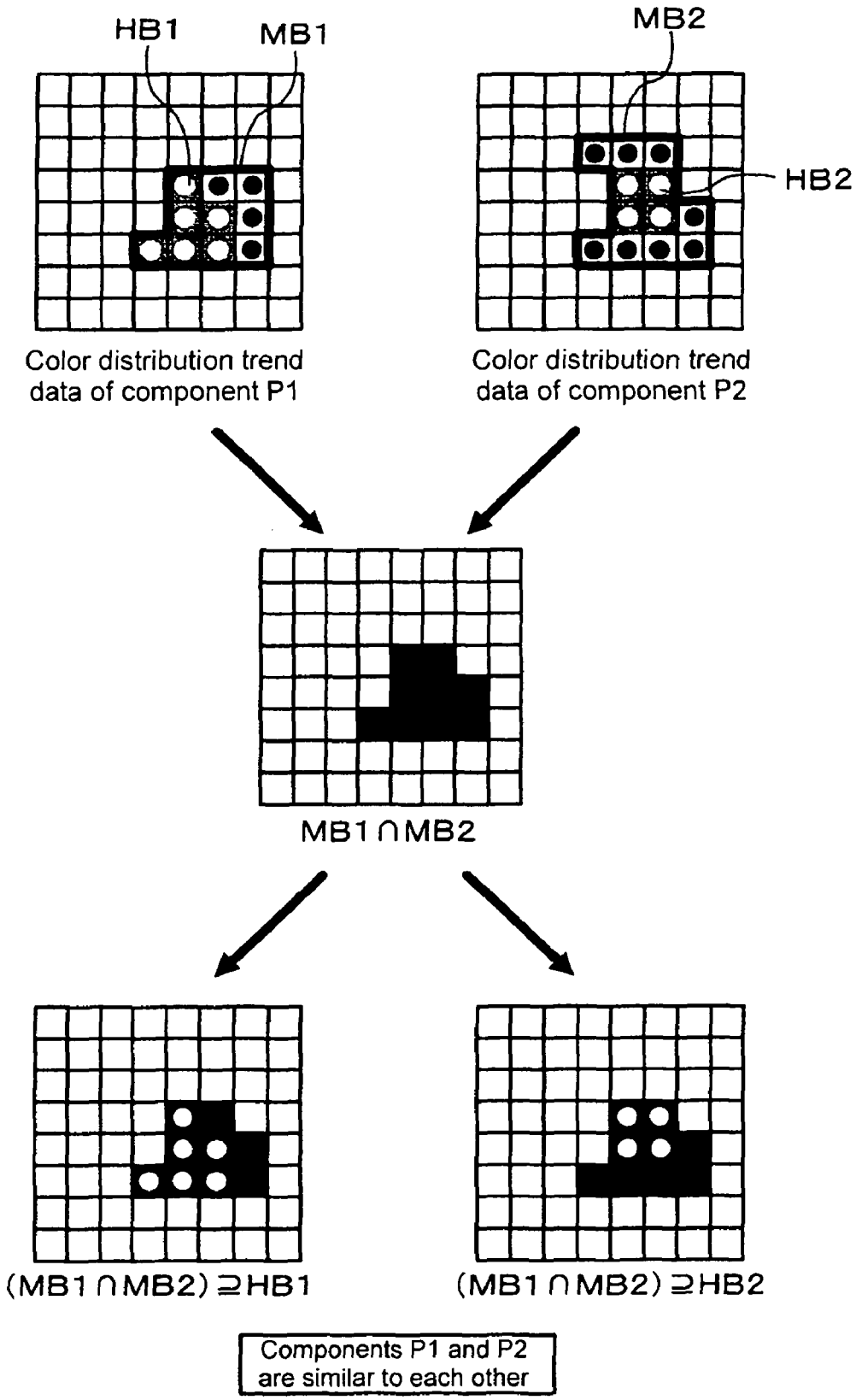
FIG. 11 shows an example of a color distribution trend similarity determination process.
Figure 12:
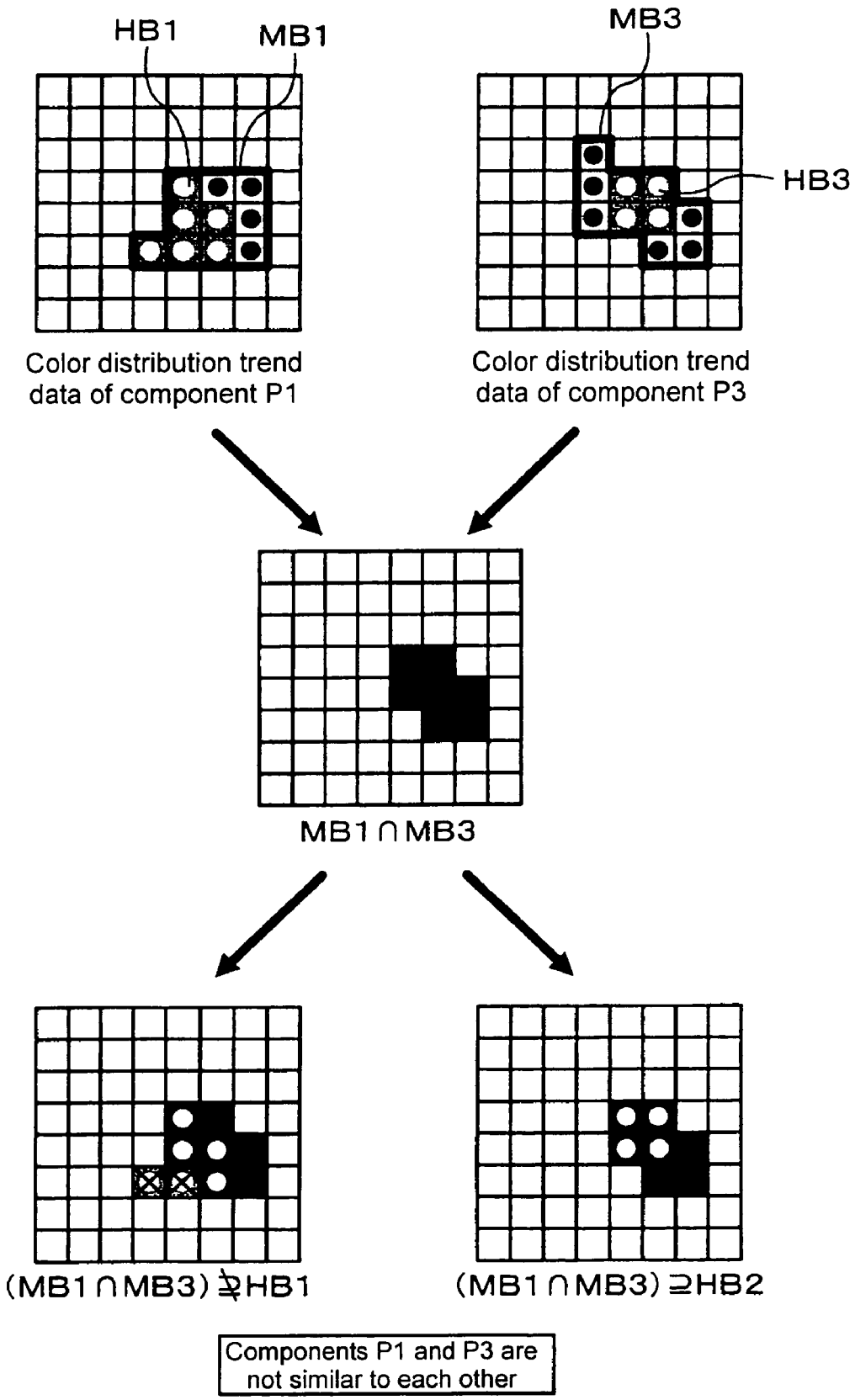
FIG. 12 shows an example of the color distribution trend similarity determination process.

FIGS. 11 and 12 show specific examples of a color distribution trend similarity determination process. It is determined that the component P1 and component P2 are similar to each other, because the component P1 and component P2 satisfy the above expressions. On the other hand, it is determined that the component P1 and component P3 are not similar to each other, because HB1 is not the subset of (MB1$\cap$MB3).

The similarity determination is separately performed to the acceptable color distribution and the defective color distribution. When both the acceptable color distribution and the defective color distribution search the similar component, the similarity determinations of the acceptable color distribution and defective color distribution may be performed. When only the acceptable products are prepared as the sample of the new component P1, only the similarity determinations of the acceptable color distribution may be performed. And also, when only the defective products are prepared as the sample of the new component P1, only the similarity determinations of the defective color distribution may be performed. Generally the color distribution trends are similar to one another in components in which the kind of the component is common (similar). Therefore, the similarity determinations are performed to all the previously inspected components registered in the color distribution trend DB 55, but the component having the similar color distribution trend may be selected from the previously inspected components whose kind is in common with the component P1.

When the plural similar components are found, the similar-component selecting function 53 may select all the similar components, or the similar-component selecting function 53 may select only the component having the highest similarity. For example the similarity between the component P1 and the component P2 can be determined by the following formula.

Similarity=the number of blocks included in ($HB1 \cap HB2$)/the number of blocks included in ($HB1 \cup HB2$)

When the previously inspected component whose color distribution trend is similar to that of the component P1 is selected in the above manner, the teaching data generating function 54 reads the image of the corresponding previously inspected component from the component image DB 56 (Step S205). The teacher image information (teaching data) for generating the inspection logic of the component P1 is generated from the image of the component P1 and the image of the previously inspected component (Step S206). The teacher image information includes the image and teacher information for indicating whether the image is the acceptable image or the defective image. The generated teacher image information is stored in the teacher image information DB 57.

Through the above-described process, the previously inspected component in which the acceptable and defective shapes are similar to those of the new component P1 is identified based on the color distribution trend, and the image of the component P1 is expanded (increased in number) by utilizing the image of the identified previously inspected component. Therefore, the number of pieces of teacher image information sufficient to generate the inspection logic can be prepared, even if the number of samples of the component P1 does not reach the necessary number of images. The generated teacher image information is supplied to an inspection logic generating process in the inspection logic generating unit.

(Inspection Logic Generating Process)

Figure 13:
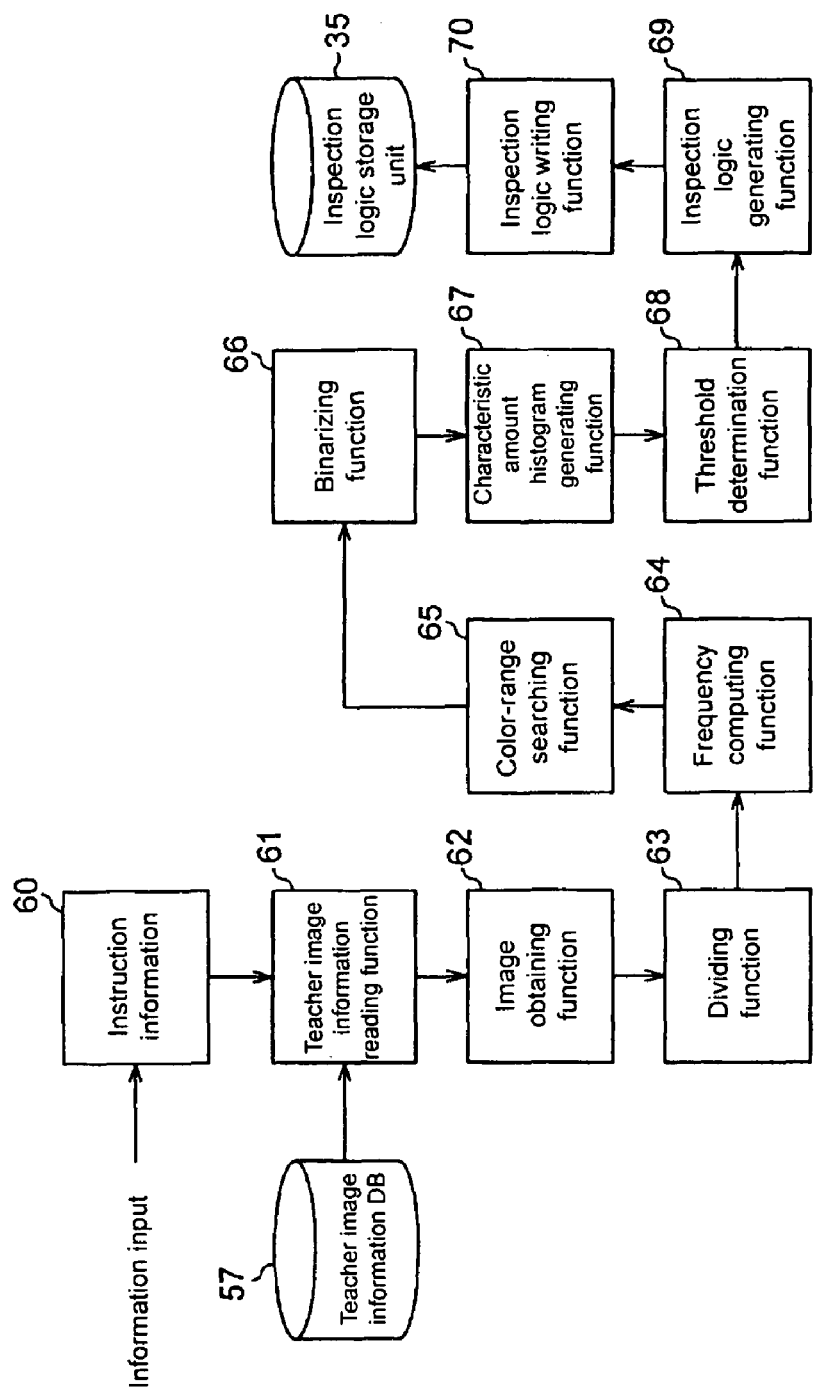
FIG. 13 shows a functional configuration of an inspection logic generating unit of the inspection logic setting apparatus.

FIG. 13 shows a block diagram of a functional configuration of the inspection logic generating unit. The inspection logic generating unit includes an instruction information accepting function 60, a teacher image information reading function 61, an image obtaining function 62, a dividing function 63, a frequency computing function 64, a color-range searching function 65, a binarizing function 66, a characteristic amount histogram generating function 67, a threshold determination function 68, an inspection logic generating function 69, and an inspection logic writing function writing function 70. A program stored in the memory or storage device is read and executed by CPU to realize these functions.

Figure 14:
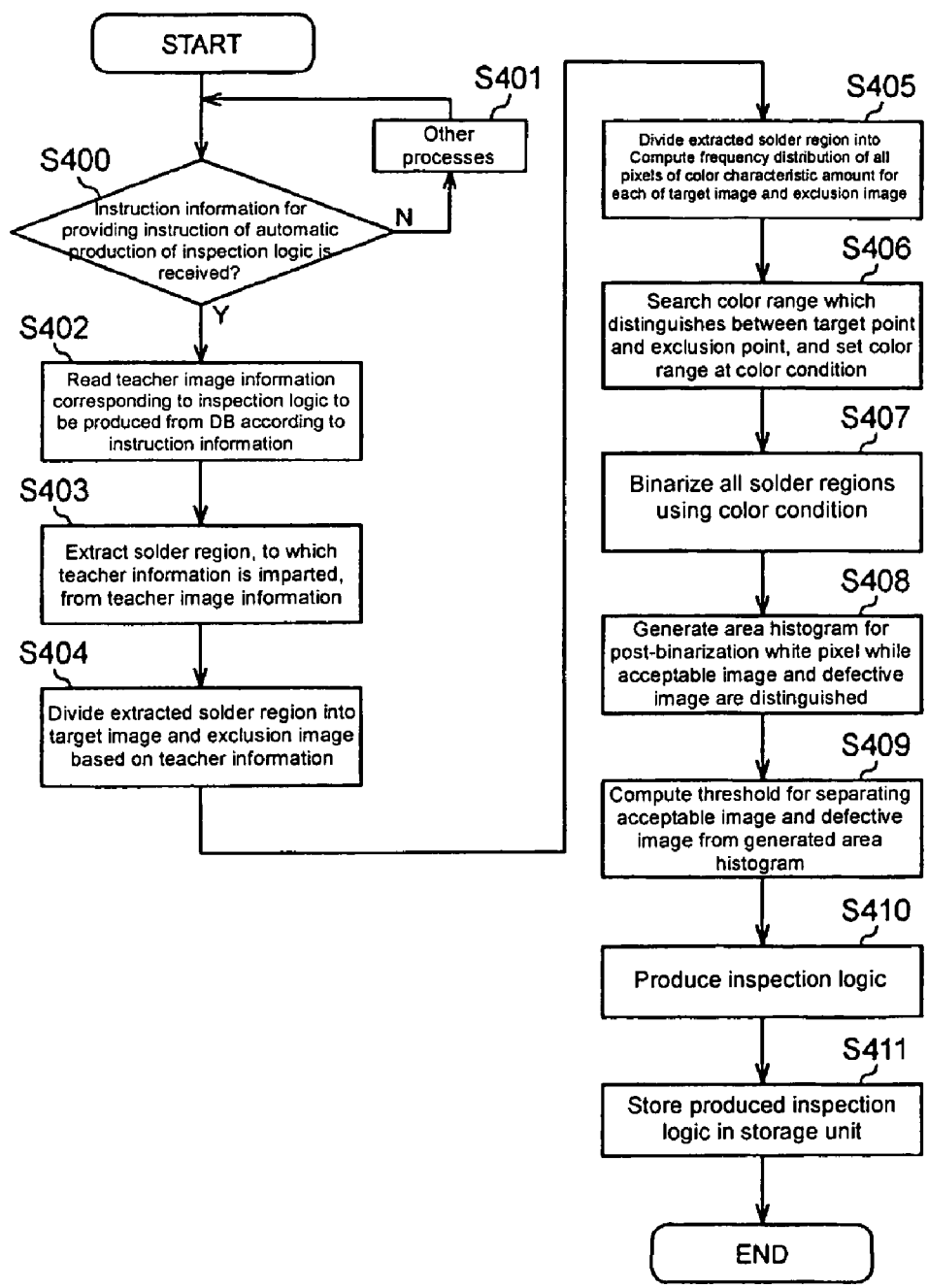
FIG. 14 shows an example of an inspection logic generating process.

A flow of an inspection logic generating process will be described with reference to a flowchart of FIG. 14. An example in which the inspection logic used in the fillet inspection will be cited in the embodiment.

The instruction information accepting function 60 is in the waiting state until instruction information for providing an instruction of automatic generation of the inspection logic is inputted (NO in Step S400 and Step S401). When the instruction information is inputted from the information input unit, the instruction information accepting function 60 transmits the instruction information to the teacher image information reading function 61 (YES in Step S400). The instruction information includes information for specifying the teacher image information of the component P1 which is of the target of inspection logic generation, a kind of the inspection logic (inspection type), etc.

The teacher image information reading function 61 reads the teacher image information from the teacher image information DB 57 according to the instruction information (Step S402). The teacher image information corresponds to the inspection logic to be produced. The teacher image information includes the acceptable image (image in which the solder fillet having the acceptable shape is photographed) and the defective image (image in which the solder fillet having the defective shape is photographed). The teacher information is imparted to each of the images.

Figure 15:
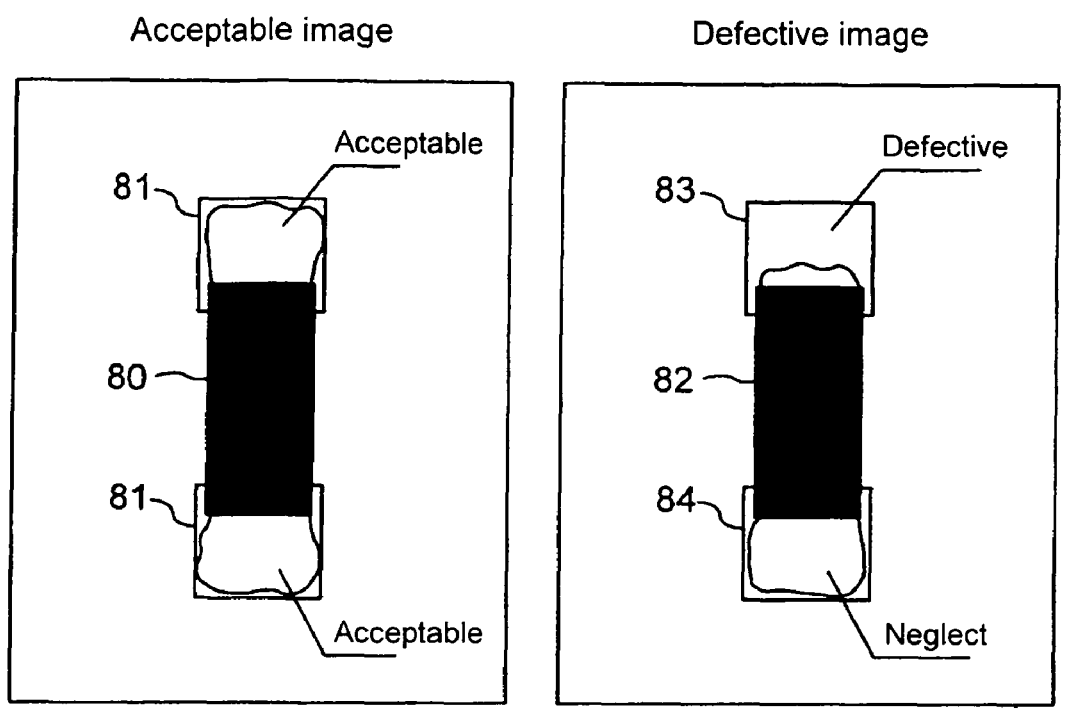
FIG. 15 shows examples of the acceptable image and the defective image.

FIG. 15 shows examples of the acceptable image and the defective image. In the acceptable image, acceptable solder fillets are formed on land regions 81 located at both ends of a component 80. The teacher information of "acceptable" is imparted to each of the land regions 81. On the other hand, in the defective image, a component 82 is obliquely mounted, which causes defective soldering in a land region 83 on one side. Therefore, the teacher information of "defective" is imparted to the land region 83. The teacher information of "neglect" is imparted to a land region 84 on the opposite side.

Figure 16:
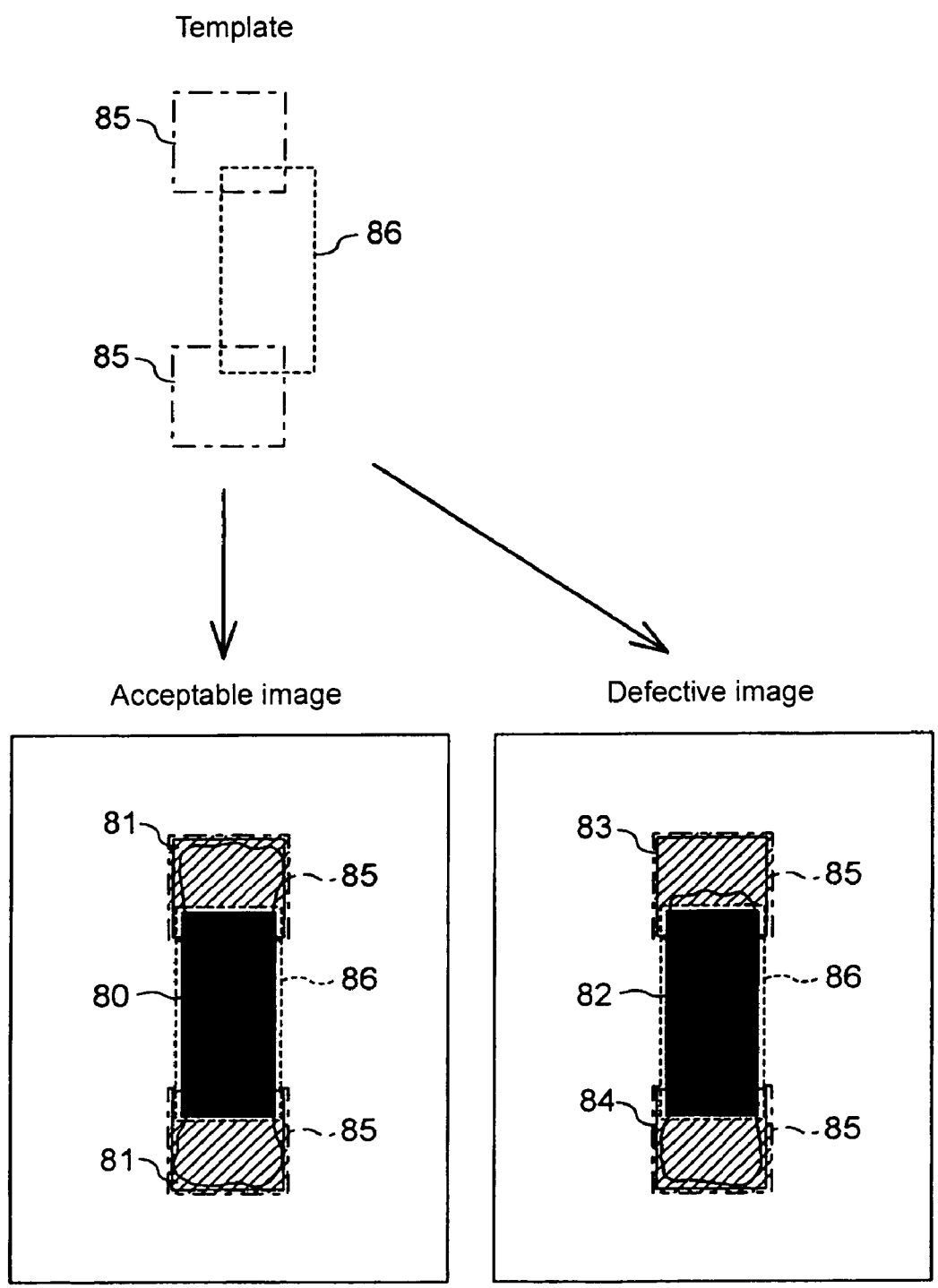
FIG. 16 shows a solder region extracting process.

When the teacher image information is read, the image obtaining function 62 extracts the solder region (focused region), to which the teacher information is imparted, from the teacher image information (Step S403). As shown in FIG. 16, the image obtaining function 62 has a template including a land window 85 and a component main body window 86. The windows 85 and 86 are fitted into the land regions 81, 83, and 84 and the components 80 and 82 in the image by enlarging or compressing the template or by shifting a relative position between the land window 85 and the component-main body window 86. For example, a technique such as the template matching may be utilized to fit the window. Therefore, the land region is specified for each of the acceptable image and the defective image. In the embodiment, a portion where a portion overlapping with the component main body window 86 is removed from the land windows 85 is extracted as the focused region (see oblique line portion of FIG. 16).

Then, the dividing function 63 divides the extracted solder region into a target image and an exclusion image based on the teacher information (Step S404). Because the acceptable product detection is the purpose in the example, the target image is set at the solder region to which the teacher information of "acceptable" is imparted, and the exclusion image is set at the solder region to which the teacher information of "defective" is imparted. The teacher information of "neglect" is imparted is neglected.

In this case, the target image indicates the acceptable solder fillet, and the exclusion image indicates the defective solder fillet. Therefore, producing the optimum color condition for the fillet inspection is equivalent to determining an optimum solution of the color range such that the number of pixel colors of the target image is included as much as possible while the pixel color of the exclusion image is substantially removed.

The frequency computing function 64 determines the color characteristic amount values of all the pixels of the target images and exclusion images (Step S405). At this point, assuming that the pixel of the target image is set at "target point" and the pixel of the exclusion image is set at "exclusion point", the frequency is computed in the form in which the target image and the exclusion image can be distinguished from each other. The color histogram used in Step S405 is similar to that used in the teaching data generating process.

Figure 17A:
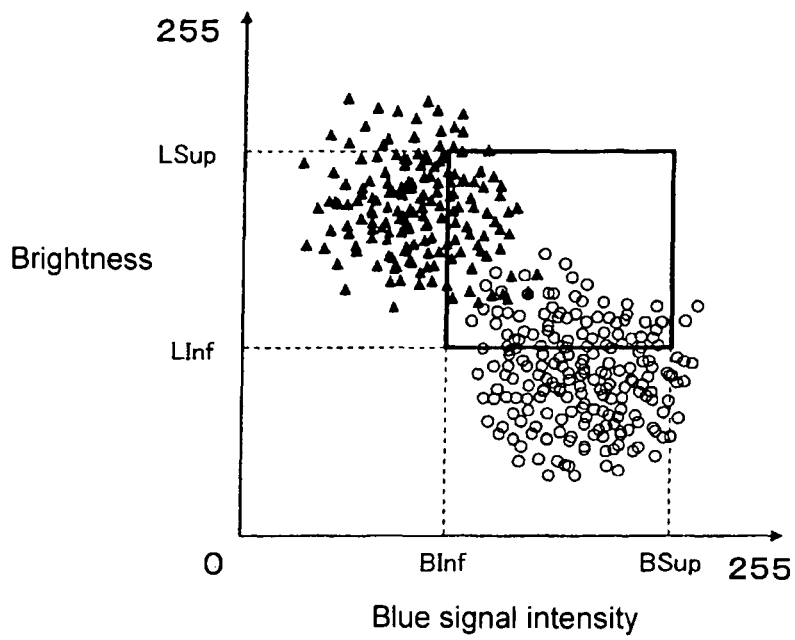
FIG. 17 shows a color range searching process.

FIG. 17A shows an example of the two-dimensional color histogram. The horizontal axis of FIG. 17A indicates the blue intensity, the vertical axis indicates the brightness, and both the blue intensity and the brightness are expressed by the 256 levels ranging from 0 to 255. The blue signal intensity becomes weaker as the blue intensity is brought close to zero. That is, the blue component is not included in the pixel as the blue intensity is brought close to zero, and the blue signal intensity becomes stronger as the blue intensity is brought close to 255. The brightness is increased as the value of the brightness is increased. In FIG. 17A, the white circle (○) expresses the point at which the frequency of the pixel (target point) of the target image is at least one, and the black triangle (▲) expresses the point at which the frequency of the pixel (exclusion point) of the exclusion image is at least one. The white circle and the black triangle have the three-dimensional data of (blue intensity, brightness, frequency).

The color range searching function 65 searches the color range which optimally distinguish between the color distribution of the target point and the color distribution of the exclusion point based on the frequency distributions of the target point and exclusion point shown in FIG. 17A (Step S406). In the embodiment, for the purpose of the simplification of the algorithm, four values of an intensity lower (BInf), an intensity upper limit (BSup), a brightness lower limit (LInf), and a brightness upper limit (LSup) are determined as shown in FIG. 17A. The optimum solution to be determined here is a combination (BInf, BSup, LInf, LSup) of four values in which the number of target points (○) is included as much as possible while the exclusion point (▲) is not substantially included.

Figure 17B:
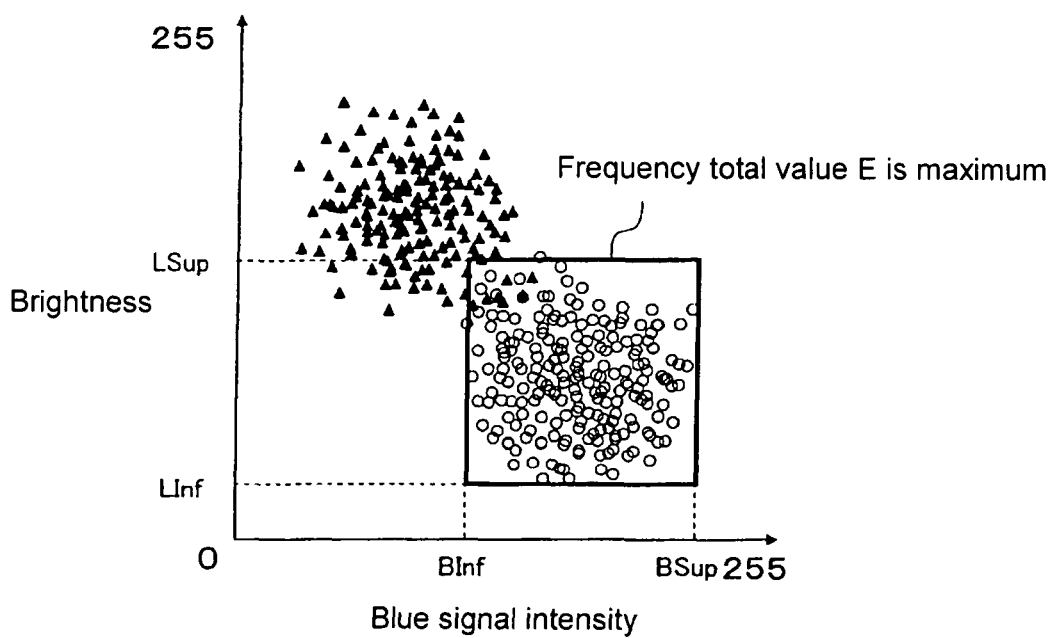

Specifically the color range searching function 65 computes a frequency total value E for each color range while the values of BInf, BSup, LInf, and LSup are changed (see Formula 1), and the color range searching function 65 determines the color range where the frequency total value E becomes the maximum. The frequency total value E is an index for indicating a difference between the number of target points (frequency) included in the color range and the number of exclusion points (frequency) included in the color range. FIG. 17B shows a color range where the frequency total value E becomes the maximum.

$$E = \sum_{b=BInf}^{BSup} \sum_{l=LInf}^{LSup} \{S(b,l) - R(b,l)\}$$ [Formula 1]

b: blue intensity
l: brightness
S(b,l): frequency of target point at point (b,l)
R(b,l): frequency of exclusion point at point (b,l)

The color range searching function 65 sets the color range, where the frequency total value E becomes the maximum, at the inspection color condition. Thus, according to the embodiment, the color characteristic amount which distinguishes between the target image (target point) and the exclusion image (exclusion point) and the combination of the color characteristic amount values are automatically generated and set at the color condition. In the embodiment, the color condition is formed by the four color parameters of the brightness upper limit, the brightness lower limit, the blue intensity upper limit, and the blue intensity lower limit. However, the parameter may be set by focusing attention on other color characteristic amounts. For example, the intensity, the brightness, chroma saturation, the hue, color stimulus specification X,Y,Z and chromaticity x,y,z in CIEXYZ, L*,a*,b* in CIELAB, etc. L*,u(u'),v(v') in CIELUV can be used as the color characteristic amount. The number of color characteristic amounts constituting the color condition is not limited to the two kinds, but the number of color characteristic amounts may be one kind or the combination of at least three kinds. That is, the color parameter adopted for the color condition can appropriately be selected in accordance with color pattern trend possessed by the solder region in the image. Alternatively, the color parameter is not previously determined, but plural color characteristic amount candidates formed by one or plural color characteristic amounts is prepared, the frequency distribution computing process and the color condition computing process are performed to each of the color characteristic amount candidates, and the optimum color characteristic amount is preferably adopted as the color condition from the color characteristic amount candidates. At this point, degrees of separation of the target point and exclusion point (in the embodiment, the maximum frequency total value E corresponds to the degree of separation) are determined for the frequency distribution of each color characteristic amount candidate to compare the degrees of separation to one another, and thereby the color characteristic amount candidate to be adopted may be determined. For example, one color characteristic amount candidate in which the degree of separation becomes the maximum may be selected, or the plural color characteristic amount candidates may be selected in the descending order of the degree of separation. In addition to the above techniques, well-known techniques such as discrimination analysis and SVM (Support Vector Machine) can be used as the technique of searching the color range.

Then, a process of automatically generating the inspection determination condition is performed using the color condition.

The binarizing function 66 binarizes all the solder regions of the acceptable image and defective image using the color condition (Step S407). In the binarizing process, the pixel included within the color range defined by the color condition is converted into the white pixel, and other pixels are converted into the black pixels.

When the binarization is performed under the color condition, the white pixel region is extremely enlarged in the acceptable image, and the white pixel region is extremely decreased in the defective image (see FIG. 5). Therefore, when the binary image is utilized, the characteristic amount for distinguishing between the acceptable product and the defective product is easy to compute quantitatively. The area, an area ratio, a center of gravity, the length, a maximum width, the shape, etc. of the white pixel region can be cited as an example of the characteristic amount. In this case, the area is selected as the characteristic amount. It is also preferable to combine the plural kinds of the characteristic amounts rather than one kind of the characteristic amount. As with the color characteristic amount, the kind of the characteristic amount may previously be determined, and a set or combination of the characteristic amount and threshold, which can distinguish best between the acceptable image and the defective image, may be adopted as a dynamic determination condition by performing a below-mentioned threshold computing process to the plural characteristic amount candidates.

Figure 18:
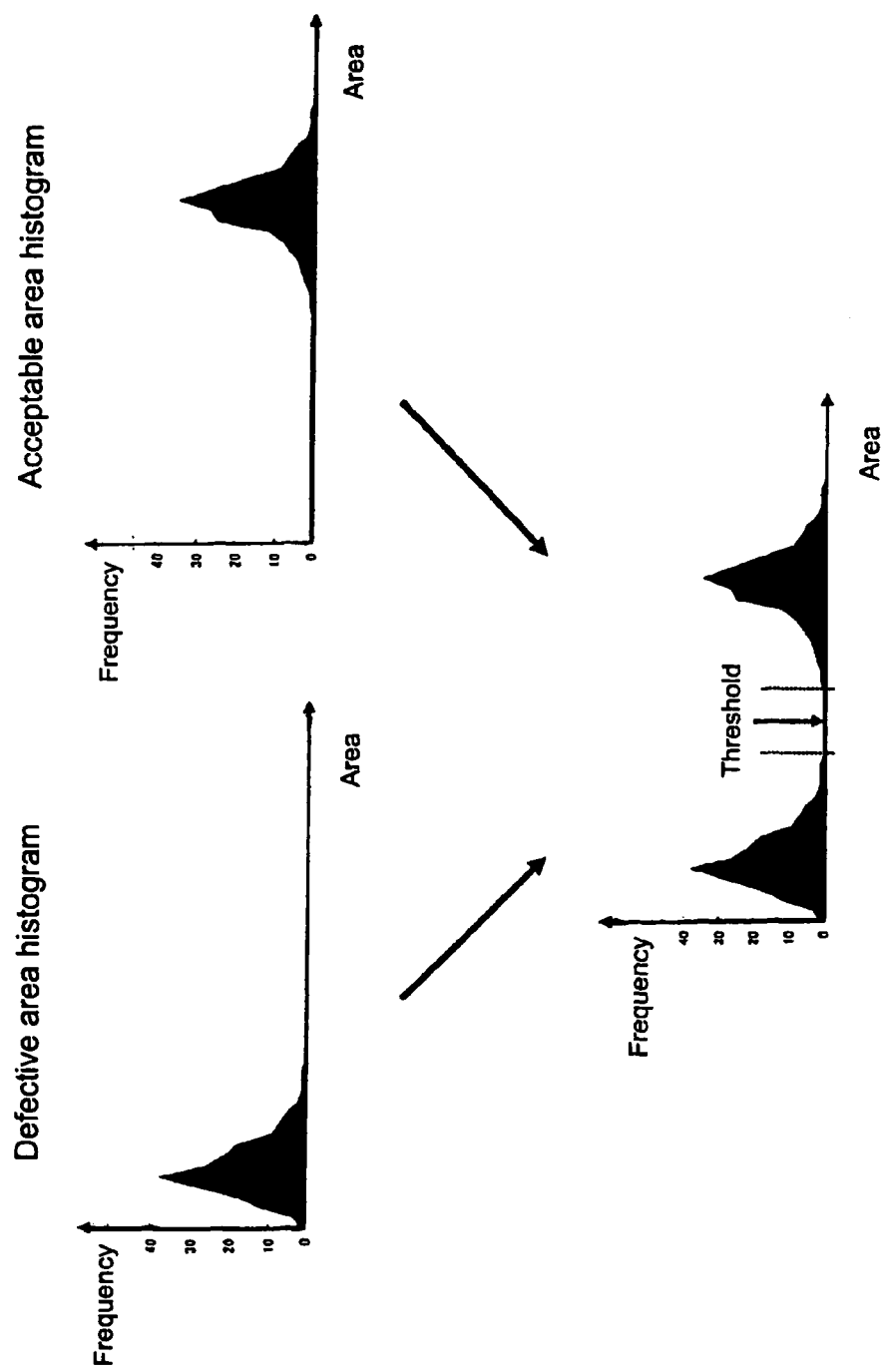
FIG. 18 shows acceptable and defective area histograms and a threshold determination process.

The characteristic amount histogram generating function 67 determines the frequency distribution of the area value of the white pixel region for each of the acceptable image and the defective image in order to comprehend the difference between the characteristic amount distribution trend of the acceptable image and the characteristic amount distribution trend of the defective image (Step S408). In this case, an area histogram is used to visually show the frequency distribution of the area value. FIG. 18 shows examples of the area histograms of the acceptable image and the defective image (hereinafter simply referred to as "acceptable histogram" and "defective histogram"). As can be seen from FIG. 18, the clear difference emerges between the characteristic amount distribution of the acceptable image and the characteristic amount distribution of the defective image.

Then, the threshold determination function 68 computes the threshold, which can best separate the characteristic amount value of the acceptable image and the characteristic amount value of the defective image, based on the frequency distributions of the acceptable histogram and defective histogram (Step S409). There have been proposed various techniques of separating the two mountains emerging in the characteristic amount histogram. In this case, any technique may be adopted. For example, Otsu's discrimination analysis may be utilized, or a point separated away from a peak of the mountain by 3σ may be set at the threshold based on experience. Thus, the threshold for distinguishing between the acceptable product and the defective product is generated.

The inspection logic generating function 69 generates the inspection logic from the color condition and the determination condition (Step S410), and the inspection logic writing function 70 writes the inspection logic in the inspection logic storage unit 35 of the board inspection apparatus 1 (Step S411).

According to the above-described inspection logic generating process, the inspection logic used in the board inspection process is automatically generated, so that a time and load required for the teaching can be largely decreased.

Even in the new component in which the number of samples is small, the sufficient amount of adequate teaching data (teacher image information) can automatically be produced, so that high-reliability inspection logic can be produced. As a result, the acceptable and defective determination can be performed with high accuracy in the component mounted state.

(Modifications)

Only one specific example is illustrated in the above embodiment. The invention is not limited to the above embodiment, but various modifications can be made without departing from the scope of the technical thought of the invention.

For example, in the above embodiment, the acceptable and defective samples are prepared as the sample of the new component P1. However, sometimes it is actually difficult to prepare the defective sample. In such cases, the color distribution trend data concerning the acceptable image is generated from the acceptable sample image, the previously inspected component having the similarity of the acceptable color distribution trend is selected, and the teaching data for the component P1 may be generated from the acceptable image for the component P1 and the defective image of the selected previously inspected component. In the case where it is necessary to increase the number of acceptable images, the acceptable image of the previously inspected component may be utilized.

In the above embodiment, the image of the previously inspected component is directly utilized. However, the image in which the deformation or the correction is performed to the image may be utilized if necessary. For example, in the case where the new component differs from the previously inspected component in the shape and size of the focused region, the shape and size of the focused region of the previously inspected component may be matched with those of the focused region of the new component by deforming, enlarging, and compressing the image of the previously inspected component.

In the above embodiment, the solder portion (land portion) is set at the focused region. However, the place of the focused region may appropriately be set according to the inspection type, etc. For example, in the case where the lack of the component is inspected by presence or absence of the component, the main body portion of the component is set at the focused region. When the color of the component main body emerges in the focused region, it is determined that the product is acceptable. When the color of the board emerges in the focused region, it is determined that the product is defective (lack of component). The sample image for teaching the color of the component main body and the sample image for teaching the color of the board are required in this kind of inspection. In this case, when the number of samples of the new component is small, or when the samples are prepared only for the component main body or the board, the previously inspected component having the similarity of the color distribution trend of the component main body or the board can be utilized from the previously inspected components like the above embodiment.

In the above embodiment, the original image is stored and utilized as the image of the previously inspected component. The image in which the original image is appropriately processed may be stored and utilized as the image. For example, the post-pixel mapping color histogram may be stored in the component image DB. Therefore, load on the inspection logic generating process can be reduced. That is, in addition to the original image, the image in the invention includes data in which the process (of generating the data format suitable to the storage, the utilization, and the inspection logic generating process) is performed to the original image.

In the color condition of the above embodiment, the two color characteristic amounts are used as the parameter, the color range is regulated by the maximum value and minimum value of the color characteristic amount, and the range expressing the rectangular shape is set in the two-dimensional plane. However, the color range determination method is not limited to the embodiment, but the rage expressing a circle, a polygonal shape, a free-form curve graphic, etc. may be set in the two-dimensional plane. In the case where at least three parameters are used, similarly the maximum value and the minimum value are determined for each parameter to set the combination thereof at the color range, or color range may be expressed for the combination of at least two parameters (for example, range expressing sphere in three-dimensional space). In addition to the technique described in the embodiment, the well-known techniques such as the discrimination analysis and SVM (Support Vector Machine) can be used as the technique of searching the color range.

In the above embodiment, the fillet inspection is cited as an example. The invention can also be applied other board inspection processes as long as a region is extracted based on the color condition to make the determination of a certain characteristic amount possessed by the extracted region based on the determination condition.

In the above embodiment, the area is used as the characteristic amount. In addition, the area ratio, the length, the maximum width, the center of gravity, etc. can preferably be adopted as the characteristic amount used in the acceptable and defective determination. The area ratio means an occupancy rate of the area binarized in the land window. For example, when the component is soldered while shifted from the land region, the area of the solder region is increased or decreased, so that the area ratio is changed. When the change in area ratio is treated as the characteristic amount, the area ratio is effective in inspecting the component shift. The length means the length in the longitudinal direction or in the crosswise direction of the white pixel region, and the maximum length means the maximum value in the lengths of the white pixel region. The center of gravity means the relative position of the center of gravity of the white pixel region with respect to the land window.

Any characteristic amount may be used as long as the acceptable and defective determination can be performed with high accuracy. It is preferable that the plural kinds of the characteristic amounts be combined in order to improve the accuracy. The plural kinds of the characteristic amounts are extracted in the inspection logic setting process, and the kind of the characteristic amount in which the acceptable image and defective image are best separated can be adopted as the characteristic amount. In the above embodiment, the area histogram (area value histogram) is used in determining the determination condition. When the different kind of the characteristic amount is adopted, the corresponding characteristic amount histogram (area ratio histogram, length histogram, maximum width histogram, gravity center histogram, etc.) can be used. For example, when the area ratio histogram is used instead of the area value histogram, the acceptable and defective determination is performed by the occupation rate of the pixel binarized by the color parameter in the land window. Therefore, even if the component is shifted or inclined to increase or decrease the size of the land window, the determination process can be performed with no influence of the size of the land window.

What is claimed is:

1. A method of generating inspection logic used in board inspection, the board inspection determining whether a surface-mounted state of a new component is acceptable or defective by checking a color of a focused region in an inspection image of the board surface-mounted new component, the method comprising:
    storing a reference image of each of a plurality of previously inspected components in a storage device of an information processing apparatus;
    computing color distribution trend data which indicates a color distribution trend of a focused region in each of the reference images of the previously inspected components;
    obtaining the image of the new component;
    computing color distribution trend data which indicates the color distribution trend of the focused region in the inspection image of the new component;
    selecting the previously inspected component having the color distribution trend similar to that of the new component by comparing the color distribution trend data concerning the new component and the color distribution trend data concerning the previously inspected component;
    reading the image of the selected previously inspected component from the storage device; and
    generating the inspection logic of the new component using the inspection image of the new component and the reference image of the read previously inspected component as teaching data;
    wherein the color distribution trend data is computed based on a distribution on a color space of a color characteristic amount value obtained from a pixel of the focused region, and
    wherein the method is performed by the information processing apparatus.

2. An inspection logic setting method according to claim 1, wherein the inspection image of the new component is formed only by an acceptable image, only by a defective image, or by both the acceptable image and the defective image, and
    the reference image of the previously inspected component is formed by both the acceptable image and the defective image.

3. An inspection logic setting method according to claim 1, wherein a kind of the component is also stored in the storage device, and
    an information processing device selects the component having the similar color distribution trend from the previously inspected components having the kind common to the new component and the previously inspected component.

4. An inspection logic setting method according to claim 1, wherein the color distribution trend data is data in which the distribution of the color characteristic amount value obtained from the pixel of the focused region is expressed by combination of blocks partitioning the color space.

5. An inspection logic setting method according to claim 1, wherein the kind of the color characteristic amount used in computing the color distribution trend data is a color characteristic amount which is selected such that a difference is generated between a distribution of the color characteristic amount value obtained from the pixel of the focused region in an acceptable image and a distribution of the color characteristic amount value obtained from the pixel of the focused region in a defective image.

6. An inspection logic setting method according to claim 1, further comprising:
    determining a frequency distribution of the color characteristic amount value of each of a target point and an exclusion point for one or a plurality of color characteristic amount values, assuming that each pixel of the focused region in an acceptable image is set at a target point in the teaching data and each pixel of the focused region in a defective image is set at an exclusion point in the teaching data;
    determining a range of the color characteristic amount value, which best separates the color characteristic amount value of the target point and the color characteristic amount value of the exclusion point, based on the frequency distribution of the one or plurality of color characteristic amount values; and
    setting a kind and a value range of the one or plurality of color characteristic amounts at a color condition for extracting a specific color region from the focused region in the inspection image of the component to be inspected.

7. An inspection logic setting method according to claim 6, further comprising:
    extracting a pixel region satisfying the color condition from each of the focused region in the acceptable image in the teaching data and the focused region in the defective image in the teaching data;
    determining a frequency distribution of a characteristic amount value of each of the plurality of pixel regions for the one or plurality of characteristic amount concerning the extracted pixel region;
    determining a range of the characteristic amount value, which best separates the characteristic amount value of the target point and the characteristic amount value of the exclusion point, based on the frequency distribution of the one or plurality of characteristic amount values; and
    setting the kind and the value range of the one or plurality of characteristic amounts at a determination condition for determining whether the surface-mounted state of the component to be inspected is acceptable or defective.

8. An apparatus for generating inspection logic used in board inspection, the board inspection determining whether a surface-mounted state of a new component is acceptable or defective by checking a color of a focused region in an inspection image of a board surface-mounted component, the apparatus comprising:
    a storage device in which a reference image of a previously inspected component is stored;
    an image obtaining device which obtains an inspection image of the new component;
    a color distribution trend computing device which computes both color distribution trend data for indicating a color distribution trend of the focused region in the inspection image of the new component and color distribution trend data for indicating the color distribution trend of the focused region in the reference image of the previously inspected component;
    a similarity component selecting device which selects the previously inspected component having the color distribution trend similar to that of the new component by comparing the color distribution trend data concerning the new component and the color distribution trend data concerning the previously inspected component;

a teaching data generating device which reads the image of the selected previously inspected component from the storage device to generate teaching data from the inspection image of the new component and the reference image of the previously inspected component; and an inspection logic generating device which generates the inspection logic from the teaching data, wherein the color distribution trend data computing device computes the color distribution trend data based on a distribution on a color space of a color characteristic amount value obtained from a pixel of the focused region.

9. An inspection logic setting apparatus according to claim 8, wherein a kind of the component is also stored in the storage device, and the similarity component selecting device selects the component having the similar color distribution trend from the previously inspected components having the kind common to the new component and the previously inspected component.

10. An inspection logic setting apparatus according to claim 8, wherein the color distribution trend data computing device expresses the distribution of the color characteristic amount value obtained from the pixel of the focused region by combination of blocks partitioning the color space.

11. An inspection logic setting apparatus according to claim 8, wherein the color distribution trend computing device selects the color characteristic amount as the kind of the color characteristic amount used in computing the color distribution trend data such that a difference is generated between a distribution of the color characteristic amount value obtained from the pixel of the focused region in an acceptable image and a distribution of the color characteristic amount value obtained from the pixel of the focused region in a defective image.

12. An inspection logic setting apparatus according to claim 8, wherein the inspection logic generating device constituting an inspection logic apparatus includes:

a device which determines a frequency distribution of the color characteristic amount value of each of a target point and an exclusion point for one or a plurality of color characteristic amount values, assuming that each pixel of the focused region in the acceptable image is set at a target point in the teaching data and each pixel of the focused region in the defective image is set at an exclusion point in the teaching data;

a device which determines a range of the color characteristic amount value, which best separates the color characteristic amount value of the target point and the color characteristic amount value of the exclusion point, based on the frequency distribution of the one or plurality of color characteristic amount values; and a device which sets kinds and value ranges of the one or plurality of color characteristic amounts at a color condition for extracting a specific color region from the focused region in the image of the component to be inspected.

13. An inspection logic setting apparatus according to claim 12, wherein the inspection logic generating device further includes:

a device which extracts a pixel region satisfying the color condition from each of the focused region in the acceptable image in the teaching data and the focused region in the defective image in the teaching data;

a device which determines a frequency distribution of a characteristic amount value of each of the plurality of pixel regions for the one or plurality of characteristic amount concerning the extracted pixel region;

a device which determines a range of the characteristic amount value, which best separates the characteristic amount value of the target point and the characteristic amount value of the exclusion point, based on the frequency distribution of the one or plurality of characteristic amount values; and a device which sets the kind and the value range of the one or plurality of characteristic amounts at a determination condition for determining whether the surface-mounted state of the component to be inspected is acceptable or defective.

14. A board inspection apparatus comprising:

a storage unit in which a color condition and a determination condition are stored, the color condition and the determination condition being generated by a inspection logic generating method according to claim 7;

a floodlighting device which illuminates a surface-mounted component on a board with light beams of a plurality of colors at different incident angles;

a region extracting device which extracts a region satisfying the color condition from a focused region of an image taken with a reflected light beam; and an inspection device which determines the surface-mounted state of the component based on whether or not a characteristic amount possessed by the extracted region satisfies the determination condition.

* * * * *